(12) United States Patent
Lerner

(10) Patent No.: US 10,536,445 B1
(45) Date of Patent: Jan. 14, 2020

(54) DISCRETE BLOCKCHAIN AND BLOCKCHAIN COMMUNICATIONS

(71) Applicant: Daniel Maurice Lerner, Missouri City, TX (US)

(72) Inventor: Daniel Maurice Lerner, Missouri City, TX (US)

( * ) Notice: Subject to any disclaimer, the term of this patent is extended or adjusted under 35 U.S.C. 154(b) by 0 days.

(21) Appl. No.: 16/376,399

(22) Filed: Apr. 5, 2019

Related U.S. Application Data

(63) Continuation of application No. 16/173,091, filed on Oct. 29, 2018, which is a continuation of application No. 16/005,040, filed on Jun. 11, 2018, now Pat. No. 10,154,021, application No. 16/376,399, which is a continuation of application No. 16/173,384, filed on Oct. 29, 2018, which is a continuation of application No. 16/006,011, filed on Jun. 12, 2018, now Pat. No. 10,158,613, which is a continuation-in-part of application No. 16/005,040, filed on Jun. 11, 2018, now Pat. No. 10,154,021.

(60) Provisional application No. 62/653,144, filed on Apr. 5, 2018, provisional application No. 62/518,281, filed on Jun. 12, 2017, provisional application No. 62/540,352, filed on Aug. 2, 2017.

(51) Int. Cl.
*H04L 29/06* (2006.01)

(52) U.S. Cl.
CPC .................... *H04L 63/08* (2013.01)

(58) Field of Classification Search
CPC ....................................... H04L 63/08
See application file for complete search history.

(56) References Cited

U.S. PATENT DOCUMENTS

| | | |
|---|---|---|
| 4,200,770 A | 4/1980 | Hellman et al. |
| 4,218,582 A | 8/1980 | Hellman et al. |

(Continued)

OTHER PUBLICATIONS

Rafaeli et al.; A survey of key management for secure group communication; Published in: Journal ACM Computing Surveys CSUR) Surveys Homepage archive; vol. 35 Issue 3, Sep. 2003; ACM Digital Library (Year: 2003).*

(Continued)

*Primary Examiner* — Bradley W Holder
(74) *Attorney, Agent, or Firm* — ePatentManager.com; Guerry L. Grune

(57) ABSTRACT

An access control system with devices that securitize one or more blockchains using three sets of rules including authentication, validation, and access is provided. The system also can include protection of signals between one or more secure DASA databases and/or one or more blockchains for various user devices. The DASA databases may exist external to, along with, or within the blockchains. Specific methods and devices for securing (primarily digital and normally two-way) communications using applications offering the combination of securing communications from user devices with reader devices, are also provided. This disclosure also provides for the securitization and/or encryption of blockchain(s) for ensuring communication signals transmitted from and data residing within databases and/or the blockchain itself are not corruptible or compromised. In addition, communication processors for monitoring statistics regarding data at rest and data on the move associated with creating these securitized blockchains are included.

20 Claims, 13 Drawing Sheets

(56) References Cited

U.S. PATENT DOCUMENTS

| | | | |
|---|---|---|---|
| 4,405,829 A | 9/1983 | Rivest et al. | |
| 4,424,414 A | 1/1984 | Hellmn et al. | |
| 4,558,176 A * | 12/1985 | Arnold | G06F 21/10 380/29 |
| 4,578,530 A | 3/1986 | Zeidler | |
| 4,665,396 A * | 5/1987 | Dieleman | G06Q 20/341 235/382 |
| 5,214,703 A | 5/1993 | Massey et al. | |
| 5,446,880 A * | 8/1995 | Balgeman | G06F 16/258 |
| 5,675,653 A | 10/1997 | Nelson, Jr. | |
| 5,825,890 A | 10/1998 | Elgamal et al. | |
| 6,157,722 A | 12/2000 | Lerner et al. | |
| 6,466,780 B1 | 10/2002 | Geiselman et al. | |
| 6,766,161 B2 | 7/2004 | Geiselman et al. | |
| 6,917,974 B1 * | 7/2005 | Stytz | H04L 63/04 709/225 |
| 6,959,086 B2 | 10/2005 | Ober et al. | |
| 6,996,723 B1 * | 2/2006 | Kyojima | H04L 9/0822 380/45 |
| 7,032,240 B1 * | 4/2006 | Cronce | G06F 21/34 705/51 |
| 7,181,016 B2 | 2/2007 | Cross et al. | |
| 7,382,883 B2 | 6/2008 | Cross et al. | |
| 7,599,492 B1 * | 10/2009 | Malyshev | H04L 9/0894 380/37 |
| 7,660,422 B2 * | 2/2010 | Mitchell | H04L 9/083 380/277 |
| 8,462,955 B2 | 6/2013 | Ureche et al. | |
| 8,825,999 B2 | 9/2014 | Mohamed | |
| 9,094,191 B2 | 7/2015 | Avanzi et al. | |
| 9,213,858 B2 | 12/2015 | Sharma et al. | |
| 9,465,953 B2 | 10/2016 | Shasrma et al. | |
| 9,521,123 B2 | 12/2016 | Jueneman et al. | |
| 9,703,985 B1 | 7/2017 | Sanchez | |
| 10,154,015 B1 | 12/2018 | Lerner | |
| 10,154,016 B1 | 12/2018 | Lerner | |
| 10,154,021 B1 | 12/2018 | Lerner | |
| 10,154,031 B1 | 12/2018 | Lerner | |
| 10,158,613 B1 | 12/2018 | Lerner | |
| 10,171,435 B1 | 1/2019 | Lerner | |
| 10,171,444 B1 | 1/2019 | Lerner | |
| 2002/0124177 A1 * | 9/2002 | Harper | G06F 21/6245 713/189 |
| 2004/0022222 A1 * | 2/2004 | Clisham | H04L 69/18 370/338 |
| 2005/0047600 A1 * | 3/2005 | Newkirk | H04W 12/04 380/278 |
| 2005/0069139 A1 * | 3/2005 | Higurashi | G06F 21/10 380/284 |
| 2005/0201564 A1 * | 9/2005 | Kayashima | H04L 9/0891 380/283 |
| 2006/0233371 A1 * | 10/2006 | Sowa | H04L 9/0822 380/248 |
| 2006/0235852 A1 * | 10/2006 | Gaug | G06F 16/2471 |
| 2006/0258296 A1 * | 11/2006 | Steer | G01S 7/021 455/67.13 |
| 2007/0168677 A1 | 7/2007 | Kudo et al. | |
| 2009/0006856 A1 | 1/2009 | Abraham et al. | |
| 2012/0198538 A1 | 8/2012 | Spring et al. | |
| 2012/0314867 A1 * | 12/2012 | Tomaru | H04L 9/08 380/270 |
| 2014/0237562 A1 | 8/2014 | Nandakumar | |
| 2015/0195089 A1 * | 7/2015 | Yajima | H04L 9/0869 380/46 |
| 2016/0283920 A1 | 9/2016 | Fisher et al. | |
| 2016/0358397 A1 | 12/2016 | Kristensen et al. | |
| 2017/0012642 A1 | 1/2017 | Declercq et al. | |
| 2017/0140175 A1 * | 5/2017 | Angus | G06F 21/602 |
| 2017/0264428 A1 | 9/2017 | Seger, II | |
| 2017/0365780 A1 | 12/2017 | Narayanan et al. | |

OTHER PUBLICATIONS

Papadimitratos et al.; Secure data communication in mobile ad hoc networks; Published in: IEEE Journal on Selected Areas in Communications ( vol. 24, Issue: 2, Feb. 2006 ); pp. 343-356; IEEE Xplore (Year: 2006).*

Papadimitrtos et al.; Secure data communication in mobile ad hoc networks; Published in: IEEE Journal on Selected Areas in Communications (vol. 24 Issue:2, Feb. 2006); pp. 343-356; IEEE Xplore (Year: 2006).

Tokarev, A. International Search Report. Federal Institute of Industrial Property. ISA/RU. Form PCT/ISA/210. Box A-C, dated Jul. 25, 2019, Moscow, Russia.

* cited by examiner

DISCRETE BLOCKCHAIN AND BLOCKCHAIN COMMUNICATIONS

PRIORITY STATEMENT

This application is a nonprovisional conversion of and takes priority under 119(e) of U.S. Provisional Application No. 62/653,144 filed Apr. 5, 2018 and entitled, Managed Securitized and Encrypted Blockchain and Blockchain Communications".

This application is also a continuation of U.S. Nonprovisional application Ser. No. 16/173,091 filed Oct. 29, 2018, which is a continuation of Ser. No. 16/005,040, filed Jun. 11, 2018 and granted as U.S. Pat. No. 10,154,021 on Dec. 11, 2018, and entitled "Securitization of Temporal Digital Communications with Authentication and Validation of User and Access Devices", which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

This application is also a continuation of U.S. Nonprovisional application Ser. No. 16/173,384 filed Oct. 27, 2018, which is a continuation of Ser. No. 16/006,011 filed Jun. 12, 2018 and granted as U.S. Pat. No. 10,158,613 on Dec. 18, 2018, entitled "Combined Hidden Dynamic Random-Access Devices Utilizing Selectable Keys and Key Locators for Communicating Randomized Data together with Sub-Channels and Coded Encryption" which is a nonprovisional conversion of US Provisional Application entitled "Combined Hidden Dynamic Random Access Devices Utilizing Selectable Keys and Key Locators for Communicating Randomized Data together with Sub-Channels and Coded Encryption Keys" with Ser. No. 62/540,352, filed Aug. 2, 2017.

Further, application Ser. No. 16/006,011, filed Jun. 12, 2018, granted as U.S. Pat. No. 10,158,613 on Dec. 18, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

In addition, each application is hereby fully incorporated by reference.

FIELD

The present disclosure relates to randomized encryption of communications, and more particularly to a system that encrypts and decrypts signals between devices to ensure that the communications utilizing blockchain technologies are discoverable by only designated third parties or not discoverable at all. Methods and devices for encryption of these (primarily digital and normally two-way) communications to, from, and within a blockchain using applications that may be combined with authorization and validation for receiving, storing, and retrieval of electronic, optical, and/or electro-optical communications in the form of voice, data, or optical transmissions, are also included. These encrypted and decrypted data and data communications require special encryption techniques essential to denying fraudulent or otherwise unauthorized third parties with the ability to access sealed encrypted transmissions used with data at rest as well as for data on the move and specific to data to, from and within the blockchain.

The present disclosure includes devices and a system that is specifically suited for data transmission applications that require a need for discrete communications, preserving privacy of information, electronic commerce transactions, electronic mail communications all required for solving security issues associated with and needed to secure the blockchain.

BACKGROUND

Simply put, a blockchain is a type of distributed ledger or decentralized database that keeps continuously updated digital records of who owns what. Rather than having a central administrator like a traditional database such as utilized by banks, governments, accountants, etc., or in one location in the cloud, a distributed ledger has a network of replicated databases, synchronized (often via the internet) and visible to anyone within the network. Blockchain networks can be private with restricted membership similar to an intranet, or they can utilize public internets such as the World Wide Web which can be accessed by any person in the world. When a digital transaction is carried out, it is grouped together in a cryptographically protected block with other transactions that have occurred in a segment of time (normally the last 10 minutes) and sent out to the entire network. Miners (members in the network with high levels of computing power) then compete to validate the transactions by solving complex coded problems. The first miner to solve the problems and validate the block receives a reward. (In the Bitcoin Blockchain network, for example, a miner would receive Bitcoins). Cryptocurrency and associated mining is what has led to popularizing the use of blockchain.

The validated block of transactions is then timestamped and added to a chain in a linear, chronological order. New blocks of validated transactions are linked to older blocks, making a chain of blocks that show every transaction made in the history of that blockchain. The entire chain is continuously updated so that every ledger in the network is the same, giving each member the ability to prove who owns what at any given time or any given instance.

According to Vitalik Buterin, the co-creator and inventor of Ethereum (another cryptocurrency) described as a "decentralized mining network and software development platform rolled into one" that facilitates the creation of new cryptocurrencies and programs that share a single blockchain (a cryptographic transaction ledger).

"A blockchain is a magic computer that anyone can upload programs to and leave the programs to self-execute, where the current and all previous states of every program are always publicly visible, and which carries a very strong crypto economically secured guarantee that programs running on the chain will continue to execute in exactly the way that the blockchain protocol specifies."

Blockchain's decentralized, open and cryptographic nature allow people to trust each other and transact peer to peer, making the need for intermediaries obsolete. This also brings unprecedented security benefits. Hacking attacks that commonly impact large centralized intermediaries like banks would be virtually impossible to pull off on the blockchain. For example, if someone wanted to hack into a particular block in a blockchain, a hacker would not only need to hack into that specific block, but all of the proceeding blocks going back toward and including the entire history of that blockchain. The hacker/perpetrator would also need to carry out this procedure for every ledger in the network, which could include millions, and simultaneously.

Blockchain is a highly disruptive technology that promises to change the technology world as we know it today (2018). The technology is not only shifting the way we use the Internet, but it is also revolutionizing the global economy. By enabling the digitization of assets, blockchain is driving a fundamental shift from the Internet of information, where we can instantly view, exchange and communicate information to the Internet of value, where we can instantly exchange assets. A new global economy of immediate value transfer is on its way, where big intermediaries may no longer play a major role. An economy where trust is established not by central intermediaries but through consensus and complex computer code.

According to Don Tapscott, who is a Canadian business executive, author, consultant and speaker, and who specializes in business strategy, organizational transformation and the role of technology in business and society. He is the CEO of The Tapscott Group, and was founder and chairman of the international think tank New Paradigm before its acquisition, "The technology likely to have the greatest impact on the next few decades has arrived. And it's not social media. It's not big data. It's not robotics. It's not even AI. You'll be surprised to learn that it's the underlying technology of digital currencies like Bitcoin. It's called the blockchain."

Blockchain has applications that go way beyond obvious things like digital currencies and money transfers. From electronic voting, smart contracts and digitally recorded property assets to patient health records management and proof of ownership for digital content.

Blockchain will profoundly disrupt hundreds of industries that rely on intermediaries, including banking, finance, academia, real estate, insurance, legal, health care and the public sector-amongst many others. This will result in job losses and the complete transformation of entire industries. But overall, the elimination of intermediaries brings mostly positive benefits. Banks and governments for example, often impede the free flow of business because of the time it takes to process transactions and regulatory requirements. The blockchain will enable an increased amount of people and businesses to trade much more frequently and efficiently, significantly boosting local and international trade. Blockchain technology would also eliminate expensive intermediary fees that have become a burden on individuals and businesses, especially in the remittances space.

Brock Pierce, who in 2013 founded venture capital firm Blockchain Capital (BCC) which was reported to have raised $85 million in two venture funds by October 2017 and announced a $50 million Initial Coin Offering (ICO) by BCC in February 2017 known as EOS and marketed through a new vehicle called Block.one that is developing "end-to-end solutions to bring businesses onto the blockchain from strategic planning to product deployment", stated that "Every human being on the planet with a phone, will have equal access (to a form of blockchain). This expands the total addressable market by 4×"

In other words, perhaps most profoundly, blockchain promises to democratize and expand the global financial system. Giving people who have limited exposure to the global economy, better access to financial and payment systems and stronger protection against corruption and exploitation is certainly one advantage that will make this technology more ubiquitous. The potential impacts of blockchain technology on society and the global economy are incredibly significant. With an ever-growing list of real-world uses, blockchain technology promises to have a massive impact.

Briefly summarizing, the blockchain works as a tamper-proof distributed public ledger that manages transactions. Another way to think of this is that blockchain is like a magical Google spreadsheet in the cloud, or more specifically on a network. Put simply, a blockchain is basically an incorruptible distributed ledger of data, which can be used to store informational assets ranging from managing cryptographic contracts to transferring value. The most recognized application on a blockchain are bitcoin transactions. The transferring of value from one person to another with no central intermediary, and without allowing a person or party to spend their bitcoin (or other cryptocurrency) twice "the double spend rule". This means that "value" can have a change of title and ownership from one person/party to another, without the need of a trusted third party to validate/govern the trade.

To accomplish this, the need for governance is found in the protocol. Besides being a ledger for "data of value", or cryptocurrencies, blockchain technology is finding broader usage in peer to peer lending, (smart) contracts managements, healthcare data, stock transfers, and even elections. Like any emerging and disruptive technology, no one can predict the future of blockchain technology, but it is clear that it isn't (just) for purchasing black-market goods and services. In fact, blockchain technology is finding its way into big firms such as IBM, Microsoft, and major banking institutions. Interest in the technology is driven by (fear of disruption) the fact that it excludes trusted third parties (banks and clearinghouses) during transfer of values, which in turn results in fast, private and less expensive financial transactions.

As stated above, blockchain can facilitate the peer-to-peer transfer of anything that's of value. This may range from assets, properties, and contracts. The most crucial and far-reaching Blockchain applications is applied in Bitcoin, with transfer of value, and for Ethereum, with its enhancement of smart contracts.

As low-trust digital-based systems gain adherents and differing use cases, software developers are creating new variant blockchains to deal with the inevitable fragmentation between public, consortium and private blockchain technologies.

Here, it is important to understand the differences between public, consortium and private blockchains.

Public—

Fully decentralized and uncontrolled networks with no access permission required-anyone can participate in the consensus process to determine which transaction blocks are added. There is usually little or no pre-existing trust between participants in a Public blockchain.

Consortium—

The consensus process for new transaction blocks is controlled by a fixed set of nodes, such as a group of financial institutions where pre-existing trust is high.

Private—

Access permissions are tightly controlled, with rights to read or modify the blockchain restricted to certain users. Permissions to read the blockchain may be restricted or public.

There is usually some degree of pre-existing trust between at least some of Private blockchain participants. The degree of pre-existing trust that an organization requires, as well as necessary control over participant permissions, will determine what type of blockchain to use. Different blockchain solutions have advantages and disadvantages. Take for example, the difference between how transactions are validated within each type of blockchain:

Proof of Work (PoW):

About "mining" transactions utilizing a resource-intensive hashing process, which (a) confirms transactions between network participants and (b) writes the confirmed transactions into the blockchain ledger as a new block.

The accepted new block is proof that the work was done, so the miner may receive a 25 BTC (Bitcoins) payment for successfully completing the work. The problem with PoW is that it is resource-intensive and creates a centralizing tendency among miners based on computer resource capability.

Proof of Stake (PoS):

About "validating" blocks created by miners and requires users to prove ownership of their "stake. Validation introduces a randomness into the process, making the establishment of a validation monopoly more difficult, thereby enhancing network security.

One problem with PoS is the "nothing at stake" issue, where miners have nothing to lose in voting for different blockchain histories, preventing a consensus from being created. There are several attempts to solve this problem underway. Additional developments in this area hope to combine PoW with PoS to create hybrid blockchains with the highest security and lowest resource requirements. To that end, some developers are focused on enhancing network security through 'consensus without mining.'

Blockchains fundamentally operate on the basis of how consensus is agreed upon for each transaction added to the ledger.

To address the benefits of each type of consensus mechanism and in which situation are they best utilized, the following additional terms have been defined.

Delegated Proof of Stake—

Network parameters are decided upon by elected delegates or representatives. If you value a "democratized" blockchain with reduced regulatory interference, this version is for you.

PAXOS—

An academic and complicated protocol centered around multiple distributed machines reaching agreement on a single value. This protocol has been difficult to implement in real-world conditions.

RAFT—

Similar to PAXOS in performance and fault tolerance except that it is "decomposed into relatively independent subproblems", making it easier to understand and utilize.

Round Robin—

Utilizing a randomized approach, the round robin protocol requires each block to be digitally signed by the block-adder, which may be a defined set of participants. This is more suited to a private blockchain network where participants are known to each other.

Federated Consensus—

Federated consensus is where each participant knows all of the other participants, and where small sets of parties who trust each other agree on each transaction and over time the transaction is deemed valid. Suitable for systems where decentralized control is not an imperative.

Proprietary Distributed Ledger—

A PDL is one where the ledger is controlled, or proprietary, to one central entity or consortium. The benefits of this protocol are that there is already a high degree of pre-existing trust between the network participants and agreed-upon security measures. Suitable for a consortium or group of trading partners, such as supply chains.

PBFT—

In a PBFT system, each node publishes a public key and messages are signed by each node, and after enough identical responses the transaction is deemed valid. PBFT is better suited for digital assets which require low latency due to high transaction volume but do not need large throughput.

N2N—

Node to node (N2N) systems are characterized by encrypted transactions where only the parties involved in a transaction have access to the data. Third parties such as regulators may have opt-in privileges. Suitable for use cases where a high degree of transaction confidentiality is required.

The above list represents the current major consensus mechanisms in operation or from research organizations.

Due to the initial visibility of Bitcoin, the financial services industry has been early in researching the possible uses of consensus mechanisms to streamline operations, reduce costs and eliminate fraudulent activity.

The multi-trillion dollar global financial services industry is really composed of many different sectors, from lending to smart contracts, trading execution, letters of credit, insurance, payments, asset registration, regulatory reporting and more.

For example, the process of securing a letter of credit, which is an important import/export trading service, would likely utilize a 'consortium' approach to achieving transaction consensus.

In August, 2016 a banking consortium, R3CEV, successfully designed and executed trading smart contracts. These types of contracts could then be applicable to accounts receivable invoice factoring and letter of credit transactions.

For the use case example of cross border remittances, which would involve many individuals on both sides of the transaction, a 'public' consensus mechanism would likely be a relevant choice. Since remittances would need to have a relatively short time latency for transaction completion, a solution involving a Proof of Stake approach with its low resource requirement to validate transactions along with potentially higher security, would be compelling.

In sum, the state of blockchain development is rapidly gaining speed worldwide, yet there is much work to be done.

Numerous Global 2000 companies led by their technology executives and consultants are beginning to participate in development and testing of this revolutionary technology sector.

Organizations that begin first-hand learning about the power of blockchain technologies will have increased opportunity to lead their industry.

Existing Proof of Work and Proof of Stake protocols have various problems, such as requiring huge outlays of energy usage and increasing centralization (PoW) or participants having nothing at stake (PoS) possibly contributing to consensus disruption on mined blocks.

Tendermint co-founder Jae Kwon has published a paper describing his firm's concept and approach in this regard. Kwon's solution is twofold and does not require Proof of Work mining:

(a) A ⅔ majority of validators is required to sign off on block submission, with no more than ⅓ able to sign duplicate blocks without penalty (b) The protocol raises the penalty of double-spend attacks to unacceptably high levels by destroying the malicious actor's Bitcoin account values.

The algorithm is "based on a modified version of the DLS protocol and is resilient up to ⅓ of *Byzantine* participants."

Kwon and his team at Tendermint hope to bring speed, simplicity and security to blockchain app development.

An important and difficult to answer question remains. How does one decide on what type of blockchain to use and their relevancy for your company use case? The FIG. 1 provides a pathway for initial success, by determining the need for blockchain.

Below are a few examples of different types of blockchains, depending on the organization's greatest prioritized need and a table which organizes these needs follows.

One consideration is confidentiality. For example, in the case of a public financial blockchain, all the transactions appear on the ledgers of each participant. So, while the identities of the transacting parties are not known, the transactions themselves are public.

Some companies are developing 'supporting' blockchains to avoid this problem, by "storing or notarizing the contracts in encrypted form, and performing some basic duplicate detection." Each company would store the transaction data in their own database, but use the blockchain for limited memorialization purposes.

A second consideration is whether you need provenance tracking. Existing supply chains are rife with counterfeit and theft problems. A blockchain that collectively belongs to the supply chain participants can reduce or eliminate breaks in the chain as well as secure the integrity of the database tracking the supply chain.

A third example is the need for recordkeeping between organizations, such as legal or accounting communications. A blockchain that timestamps and provides proof of origin for information submitted to a case archive would provide a way for multiple organizations to jointly manage the archive while keeping it secure from individual attempts to corrupt it.

TABLE 1

Consensus for the Utilization of Blockchain

| | Assertion | Answer |
|---|---|---|
| Network | A significant number of participants will be transacting on the network (>100) | Agree/Yes ☐ |
| | You don't trust the participants in the network and don't need/want to know them | Agree/Yes ☐ |
| Performance | A limited amount of data needs to be stored for every transaction (a few fields) | Agree/Yes ☐ |
| | The business process doesn't require a high throughput (scalability) | Agree/Yes ☐ |
| Business Logic | The business logic is simple | Agree/Yes ☐ |
| | Privacy of transactions is not an important feature | Agree/Yes ☐ |
| | The system will be standalone, it doesn't need to access external data or be integrated in the IT legacy | Agree/Yes ☐ |
| Consensus | No arbitrator shall be involved in case of dispute | Agree/Yes ☐ |
| | All participants can be involved in the validation of transactions (Vs only a group of known validators) | Agree/Yes ☐ |
| | You need strict immutability of the record (no amend & cancel, even by admin) | Agree/Yes ☐ |

Blockchains fundamentally operate on the basis of how consensus is agreed upon for each transaction added to the ledger.

Understanding the differences between Private, Public and Consortium Blockchains is important.

As financial institutions begin to explore the possibilities of blockchain technology, they are coming up with systems that complement their existing business models. A private or a consortium blockchain platform, as opposed to the public platform that Bitcoin uses, will allow them to retain control and privacy while still cutting down their costs and transaction speeds.

In fact, this private system will have lower costs and faster speeds than a public blockchain platform can offer. Blockchain purists aren't impressed. A private platform effectively kills their favorite part of this nascent technology: decentralization. They see the advent of private blockchain systems as little more than a sneaky attempt by big banks to retain their control of financial markets.

The purists have a point, though the evil plot narrative is a bit much. If big banks can utilize a form of blockchain technology that revolutionizes finance, and if they are willing and able to pass these benefits onto their customers, then it is hardly an evil plot.

Vitalik Buterin said it best: "the idea that there is 'one true way' to be blockchaining is completely wrong headed, and both categories have their own advantages and disadvantages". This is the purpose for addressing other possibilities as listed below;

Public Blockchain

A Blockchain was designed to securely cut out the middleman in any exchange of asset scenario. It does this by setting up a block of peer-to-peer transactions. Each transaction is verified and synced with every node affiliated with the blockchain before it is written to the system. Until this has occurred, the next transaction cannot move forward. Anyone with a computer and internet connection can set up as a node that is then synced with the entire blockchain history. While this redundancy makes public blockchain extremely secure, it also makes it slow and wasteful.

The electricity (power requirements) needed to run each transaction is astronomical and increases with every additional node. The benefit is every transaction is public and users can maintain anonymity. A public blockchain is most appropriate when a network needs to be decentralized. It is also great if full transparency of the ledger or individual anonymity are desired benefits. Costs are higher and speeds are slower than on a private chain, but still faster and less expensive than the accounting systems and methods used today.

This is a good trade-off for a cryptocurrency like Bitcoin. Security is key to their users, a decentralized network is at the heart of the project and their competitors in the finance industry are still significantly more expensive and slower than a public blockchain network despite its slowness when compared to a private blockchain.

Private Blockchain

Private blockchain lets the middleman back in, to a certain extent. It is similar to the statement "better the devil you know, than the devil you don't know. Here, the company writes and verifies each transaction. This allows for much greater efficiency and transactions on a private blockchain will be completed significantly faster. Though it does not offer the same decentralized security as its public counterpart, trusting a business to run a blockchain is no more dangerous than trusting it to run a company without blockchain. The company can also choose who has read access to their blockchain's transactions, allowing for greater privacy than a public blockchain.

A private blockchain is appropriate to more traditional business and governance models, but that isn't a bad thing. Just because it is unlikely to revolutionize our world, doesn't mean it can't play a role in making the world better. Competition is key to developing the most useful products. Traditional financial institutions have long held a monopoly—technically, an oligopoly—over the industry. Their outdated products and services are a direct result of this power. Using a privately run version of blockchain technology can bring these organization into the 21st century. A number of our governance institutions are old and outdated as well.

Like finance, our government is not subject to competition. Adoption and integration will likely be slower in this sector, but if and when blockchain technologies are adopted they will cut billions of dollars of behind the scenes spending.

Imagine a truly secure online voting system. No more poll workers, voting booths, paper ballots, paid counters or organizers with cushy salaries. What's more, the barriers to voting will be greatly reduced and we will likely see an increase in turnout.

This could be accomplished with a public design, but most governments are unlikely to decentralize control and security, so a vetted private system greatly increases the chance of adoption.

Consortium Blockchain

Consortium blockchain is partly private. There has been some confusion about how this differs from a fully private system. Here again, Vitalik Buterin provides a pretty straightforward definition:

"So far there has been little emphasis on the distinction between consortium blockchains and fully private blockchains, although it is important: the former provides a hybrid between the 'low-trust' provided by public blockchains and the 'single highly-trusted entity' model of private blockchains, whereas the latter can be more accurately described as a traditional centralized system with a degree of cryptographic auditability attached."

Instead of allowing any person with an internet connection to participate in the verification of transactions process or allowing only one company to have full control, a few selected nodes are predetermined. A consortium platform provides many of the same benefits affiliated with private blockchain—efficiency and transaction privacy, for example—without consolidating power with only one company. One can think of it as trusting a council of elders. The council members are generally known entities and they can decide who has read access to the blockchain ledger. Consortium blockchain platforms have many of the same advantages of a private blockchain, but operate under the leadership of a group instead of a single entity. This platform would be great for organizational collaboration.

Imagine central banks coordinating their activities based on international rules of finance. Another scenario could include the United Nations outsourcing their transactional ledger and voting system to blockchain, allowing each country to represent a verifying node.

A major concern and major objective of the present disclosure involves the fact that many people, institutions and corporations have the belief that even the blockchain is not completely secure and perhaps even corruptible.

In recent months, Bitcoin's supporters have pointed to its falling use in illegal transactions as a sign of the cryptocurrency's growth toward mainstream acceptance. But German researchers say that links to child pornography within technology underlying Bitcoin could stifle its development. While the blockchain is largely known to be an immutable ledger of Bitcoin transactions corroborated by copies held by participating computers, it also allows its users to leave coded messages. Bitcoin's creator, Satoshi Nakamoto, famously left a cryptic message on the blockchain's original block: "The Times 3 Jan. 2009 Chancellor on brink of second bailout for banks."

Like that very first message, most of the content left on the blockchain has been relatively benign—tributes to the late Nelson Mandela, or messages to loved ones on Valentine's Day. But the ones that could be illegal, containing links to child porn, for example, could be an outsized problem for the Bitcoin community.

"While most of this content is harmless, there is also content to be considered objectionable in many jurisdictions, e.g., the depiction of nudity of a young woman or hundreds of links to child pornography," the paper authored by members of RWTH Aachen University and Goethe University read. "As a result, it could become illegal (or even already is today) to possess the blockchain, which is required to participate in Bitcoin."

The study, from RWTH Aachen University, also states that other files on the blockchain may violate copyright and privacy laws Researchers stated they had found eight files with sexual content. And three of these contained content "objectionable for almost all jurisdictions". Two of these between them listed more than 200 links to child sexual abuse imagery." Garrick Hileman, a crypto-currency expert at Cambridge University, stated that the issue of illegal content had been "discussed and known about for awhile." Pruning, or altering parts of the blockchain ledger, would allow users to rid their local copies of illegal content, he said, but was likely to be too technical for most Bitcoin users. "There are big barriers anytime you need to make modifications," Mr. Hileman said But he also added that although maintaining a complete record of the blockchain was more secure than an altered copy, "many would argue that it's not that important".

The researchers said they found 1,600 instances in which transactions on the blockchain included non-financial information, representing about 1.4% of transactions. Since the Bitcoin blockchain is immutable, those who download it are also unwittingly downloading links to child porn.

The Department of Justice did not respond to requests for comment from Fortune.

It's not the first time curious onlookers have found links to child pornography in Bitcoin's blockchain. Users first pointed out the links in 2013. Though this is perhaps the first time researchers have been able to quantify the volume of potentially illicit material hidden in the blockchain.

Additionally, since Bitcoin has buyers and traders all over the world, items in the blockchain also raise questions about legality in other nations. As the blockchain researchers note: "In China, the mere possession of state secrets can result in longtime prison sentences. Furthermore, China's definition of state secrets is vague and covers, e.g., activities for safeguarding state security. Such vague allegations with reference to state secrets have been applied to critical news in the past."

The researchers pointed out that the blockchain includes online news articles concerning pro-democracy demonstrations in Hong Kong in 2014, demonstrations that were a point of irritation for Beijing.

In an effort to rebuke the possibility that blockchain may be less than secure and/or corruptible, a research paper published in July 2017 entitled "Data Insertion in Bitcoin's Blockchain" explores this topic in more detail and explains how the coinbase data "is arbitrary and can be up to 100 bytes in size". This article states that only miners have the ability to insert data in this manner, and it's typically used to signal mining support for proposed protocol changes. There are five other ways in which data can be encoded on the bitcoin blockchain, and it is the OP RETURN option that is at the center of the child pornography story. The 2017 research paper explains that "this method is appropriate for inserting small amounts of data (or transaction metadata), but it is not suitable for large quantities of data."

80 bytes is all that OP_RETURN can store, and what's more that information is subject to deletion. That's because bitcoin nodes are capable of pruning "provably unspendable" UTXOs for efficiency, which include OP_RETURN data. Anyone wishing to use the bitcoin blockchain to seek out child pornography would need to perform the following convoluted process:

1. Download the entire bitcoin blockchain and sift through 251 million transactions to find the 1.4% that contain some kind of arbitrary data encoded in them.
2. Ensure that the version of the blockchain you were using had been subject to no pruning that might have removed OP_RETURN data.
3. Extract any web links that might be concealed in the data using some sort of steganography.
4. Type the links into your browser until you eventually found a website that was still accessible.

To assert that the bitcoin blockchain contains child pornography is disingenuous, and is no more meaningful than saying that the internet contains CP. You could live to 100 and never encounter CP on the web, because that's not how the web works. And that's not how the blockchain works either.

Asserting that there is child pornography on the blockchain would be like strolling through the U.S. Capitol Building, dropping a scrap of paper containing a deep web address, and then claiming that the American government is storing obscene content. As respected bitcoin commenter Nic Carter wrote: "Any journalist writing about arbitrary content injection into the Bitcoin blockchain should be extremely careful to detail to what extent that content exists, is extractable, viewable, etc. A text string which is a URL link to a [website displaying a thing] is not [the thing itself]. That is an extremely bad interpretation. Do not conflate the two. If you are willing to claim that "the blockchain contains X" you should be able to prove that you can extract X."

Steganography and blockchain data insertion are fascinating topics that deserve scrutiny and further study. To assert that the blockchain contains child pornography is misleading to the point of falsehood. It's possible to encode a hidden link inside any database, including Facebook, Twitter, and Wikipedia.

In any case, the present disclosure provides software developers with a new and better way to secure whatever software they're building so when that software communicates with either a copy of itself or other types of software, including the software resident in various types of devices, the data is kept safe. This application is specific to the ability to further secure one or more blockchains, which are already secure but have been reportedly hacked as stated above.

The present disclosure also relates generally to a cryptographic management scheme that provides for network security, mobile security, and specifically and more particularly relates to devices (such as containers) and a system for creating and manipulating encryption keys without risking the security of the key. The present disclosure addresses all of the needs described directly herein, as well as described earlier above. In addition, U.S. Provisional Patent Application No. 62/540,352, field Aug. 2, 2017 entitled "Combined Hidden Dynamic Random Access Devices and Encryption System Utilizing Selectable Keys and Key Locators for Communicating Randomized Encrypted Data together with Sub-Channels and Executable Coded Encryption Keys" has been added as an Appendix B to this application. The basis of this application is detailed below and includes the ability to both utilize one or more blockchains to enhance the securitization system as well as utilize the system to provide additional securitization for one or more blockchains.

As it is known in cryptology, encryption techniques (codification) using standard and evolving computerized computations or algorithms are used so that data exposed to undesirable third parties are encrypted making it difficult (and intended to be impossible) for an unauthorized third party to see or use it. Usually, for encryption, the term 'plaintext' refers to a text which has not been coded or encrypted. In most cases the plaintext is usually directly readable, and the terms 'cipher-text' or 'encrypted text' are used to refer to text that has been coded or "encrypted". Encryption experts also assert that, despite the name, "plaintext", the word is also synonymous with textual data and binary data, both in data file and computer file form. The term "plaintext" also refers to serial data transferred, for example, from a communication system such as a satellite, telephone or electronic mail system. Terms such as 'encryption' and 'enciphering', 'encrypted' and 'ciphered', 'encrypting device' and 'ciphering device', 'decrypting device' and 'decipher device' have an equivalent meaning within cryptology and are herein used to describe devices and methods that include encryption and decryption techniques.

There is an increasing need for security in communications over public and private networks. The expanding popularity of the Internet, and especially the World Wide Web, have lured many more people and businesses into the realm of network communications. There has been a concomitant rapid growth in the transmission of confidential information over these networks. As a consequence, there is a critical need for improved approaches to ensuring the confidentiality of private information.

Network security is a burgeoning field. There are well known encryption algorithms, authentication techniques and integrity checking mechanisms which serve as the foundation for today's secure communications. For example, public key encryption techniques using RSA and Diffie-Hellman are widely used. Well known public key encryption techniques generally described in the following U.S. Pat. No. 4,200,770 entitled, Cryptographic Apparatus and Method, invented by Hellman, Diffie and Merkle; U.S. Pat. No. 4,218,582 entitled, Public Key Cryptographic Apparatus and Method, invented by Hellman and Merkle; U.S. Pat. No. 4,405,829 entitled Cryptographic Communications System and Method, invented by Rivest, Shamir and Adleman; and U.S. Pat. No. 4,424,414 entitled, Exponentiation Cryptographic Apparatus and Method, invented by Hellman and Pohlig. For a general discussion of network security, refer to Network and Internetwork Security, by William Stallings, Prentice Hall, Inc., 1995.

In spite of the great strides that have been made in network security, there still is a need for further improvement. For example, with the proliferation of heterogeneous network environments in which different host computers use different operating system platforms, there is an increasing need for a security mechanism that is platform independent. Moreover, with the increasing sophistication and variety of application programs that seek access to a wide range of information over networks, there is an increasing need for a security mechanism that can work with many different types of applications that request a wide variety of different types of information from a wide variety of different types of server applications. Furthermore, as security becomes more important and the volume of confidential network transactions expands, it becomes increasingly important to ensure that security can be achieved efficiently, with minimal time and effort.

The creation of proprietary digital information is arguably the most valuable intellectual asset developed, shared, and traded among individuals, businesses, institutions, and countries today. This information is mostly defined in electronic digital formats, e.g., alphanumeric, audio, video, photographic, scanned image, etc. It is well known that a large number of encryption schemes have been used for at least the last 100 years and deployed more frequently since the onset of World Wars I and II. Since the beginning of the cold war, the "cat and mouse" spy missions have further promulgated the need for secure encryption devices and associated systems.

Simultaneously, there has been an increased need for mobility of transmissions including data and signals by physical or logical transport between home and office, or from office to office(s) among designated recipients. The dramatic increase in the velocity of business transactions and the fusion of business, home, and travel environments has accelerated sharing of this proprietary commercial, government, and military digital information. To facilitate sharing and mobility, large amounts of valuable information may be stored on a variety of portable storage devices (e.g., memory cards, memory sticks, flash drives, optical and hard disc magnetic media) and moved among home and office PCs, portable laptops, PDAs and cell phones, and data and video players and recorders. The physical mobility of these storage devices makes them vulnerable to theft, capture, loss, and possible misuse. Indeed, the storage capacity of such portable storage devices is now approaching a terabyte, sufficient to capture an entire computer operating environment and associated data. This would permit copying a targeted computer on the storage media and replicating the entire data environment on an unauthorized "virgin" computer or host device.

Another trend in data mobility is to upload and download data on demand over a network, so that the most recent version of the data is always accessible and can be shared only with authorized users. This facilitates the use of "thin client" software and minimizes the cost of storing replicated versions of the data, facilitates the implementation of a common backup and long-term storage retention and/or purging plan, and may provide enhanced visibility and auditing as to who accessed the data and the time of access, as may be required for regulatory compliance. However, thin client software greatly increases the vulnerability of such data to hackers who are able to penetrate the firewalls and other mechanisms, unless the data is encrypted on the storage medium in such a way that only authorized users could make sense of it, even if an unauthorized user were able to access the encrypted files.

There is a balance among legal, economic, national security, and pragmatic motivations to develop robust security implementations and policies to protect the storage of proprietary digital information, based on the value of the information, the consequences of its exposure or theft, and the identification and trust associated with each of the targeted recipients. In order to provide such varying degrees of protection for portable storage devices, system methods and application functionality must be developed and easily integrated into the operating procedures of the relevant institutions. Different policies defining degrees of protection are required to economically accommodate and adapt to a wide range of targeted recipient audiences for this data.

Known encryption systems for these devices include the "Data Encryption Standard" ("DES"), which was initially standardized by the "American National Bureau of Standards", currently "National Institute of Standards and Technology" ("NB S" or "NIST") in the United States. Another includes the "Fast data encipherment algorithm FEAL" (FEAL) developed later in Japan, and described in the IECEJ Technical Report IT 86-33. U.S. Pat. No. 5,214,703 entitled "Device for the Conversion of a Digital Block and Use of Same" describes the use of additional devices as does an encryption device described in U.S. Pat. No. 5,675,653 entitled "Method and Apparatus for Digital Encryption". In most cases, the user making use of protecting the data after encryption or enciphering of a plaintext has delegated the strength of the invulnerability of the encryption to be positioned in front of an enemy attack. This positioning is aimed to discover the contents of the cipher text or the encryption key used, trusting in the organizations, institutions, or experts endorsing their security and providing a degree of confusion and diffusion of values introduced by the encryption device used in the cipher text. The user encrypting a particular plaintext has no objective security regarding the degree of confusion and diffusion of values present in a cipher text that result from the application of the encryption device. Attacks on personal computers and commercial, government and military data are now commonplace; indeed, identity theft of passwords is the largest white-collar crime in the United States. Yet passwords and PINs (Personal Identification Numbers), in most cases generated by human beings who are tempted to use native-language words, Social Security Numbers, telephone numbers, etc., are still the most used access security methods for protecting portable encryption devices, and among the most vulnerable to both brute force dictionary attacks as well as sophisticated logic tracing. Professional criminal attackers and even amateur hackers now have access to sophisticated software and supercomputing networks that can unknowingly invade processing devices and storage devices, trace software instruction sequences and memory locations, and by knowing or discovering the algorithms being used, intercept and copy encryption keys, PINs, and other profile data used to protect the access to stored content. They can exploit vulnerabilities in the underlying commercial software, or in the construction of the integrated circuit chips housing and executing the cryptographic processes, or in the specialized cryptographic software, which enables exposing keys and access parameters at some deterministic point in the processing sequence. Industrial laboratory facilities are also available to read the data content stored in memory cells by measuring the electronic charge through the use of electronic beam microscopes, and thus steal stored PINs, keys, and therefore access the previously protected data.

Many prior art methods exist for the key management protection necessary for securing key encryption keys for large groups of users. Split-key secret sharing schemes have been proposed whereby the decryption key is split and shared among multiple parties or entities to be combined to reconstitute the decryption key. In these cases, however, the individual secret shares themselves are maintained statically in multiple storage devices, generally on-line, where they are susceptible to attackers, particularly from within the institution, who can target the secret shares and recombine then to form the decryption key. Such solutions are often implemented for relatively static configurations of computing and storage devices and related communities of interest or tiers of users, and have not addressed the ability to so protect key encrypting keys when the data itself, and the means to encrypt and decrypt the data and to generate and recombine the shared secrets, are on a portable device.

Current file encryption systems provide a technique for a general-purpose computer to encrypt or decrypt computer-based files. Current encryption and decryption techniques typically rely on lengthy strings (e.g., 1024 bits, 2048 bits, 4096 bits, or more) to provide for secure encryption or decryption of files. Computer performance suffers due to the amount of data in the messages as well as the size of the encryption keys themselves.

Asymmetric file encryption systems use a different key to encrypt a file from the key used to decrypt the encrypted file. Many current file encryption systems rely on asymmetric encryption, such as those that rely on public key/private key pairs. An example of an encryption algorithm that utilizes public key/private key pairs is the RSA (Rivest, Shamir, and Adleman) algorithm. Symmetric file systems use an identical key to encrypt a file as the key used to decrypt the encrypted file. Certain file encryption systems utilize a cryptographic process or random number generator to derive a random symmetric key known as the file encryption key (FEK). The FEK is used to encrypt the file. Symmetric cryptography functions up to five orders of magnitude faster than asymmetric cryptography on files. Even with a very fast key device or software that encrypts/decrypts using the asymmetric key, any such file encryption system still has to overcome the fact that asymmetric keys generally operate at orders of magnitude slower than symmetric keys. When using the file encryption key, each time a file is being authenticated, the file encryption key has to be decrypted by the asymmetric key which is time consuming, but becoming less so as computer speeds and operations are constantly improving.

What is needed are highly robust and proven security techniques incorporated into new system methods and into new commercially available portable storage hardware apparatus to implement configurable security policies for accessing information through rigorous authentication means, to secure the information with certified levels of accepted cryptographic technology, and to rigorously control the environment within which the information is shared.

In addition, there is a need to better secure portable storage apparatus and method of encrypting and sealing digital information files and storing them in the device's integral or removable memory, or alternatively on the host device's memory or other ancillary memory storage devices, while operating under cryptographically protected security policies for transport and authorized access to such digital information.

There is also a need for secure physical and logical transport of data to and from multiple recipients. To this end, it is desirable to provide a means of securely transporting data from one place to another, if the user has to carry the data or physically transport the data and the secure encryption device, and somehow communicate the information necessary to log on and access the data by another authorized user. What is required are a multiplicity of methods to securely transport the encrypted data, either physically or logically, between an Originator user and one or more Receivers.

The use of encryption devices by the general population is becoming very common in for example, commercial electronic transactions and/or electronic mail. A predominant portion of all societies want to believe in an objective, easily verified way, that the maximum degree of the diffusion and confusion (encryption) of data and data values provided by a system they are using to encrypt their data, is the superior set of encrypted devices and system.

The present disclosure also relates generally to a cryptographic management scheme that provides for network security, mobile security and specifically and more particularly relates to devices and a system for creating and manipulating encryption keys without risking the security of the key while enhancing the security of the blockchain as well as utilizing the blockchain to enhance the security of the cryptographic management scheme. The present disclosure addresses all of the needs described directly herein, as well as described earlier above.

SUMMARY

The present disclosure and associate inventiveness regarding blockchain securitization can also be described as a computer enabled access control system comprising; a real or virtual master distributed auto-synchronous array (DASA) database that at least stores and retrieves data and that includes at least two or more partial distributed auto-synchronous array (DASA) databases wherein the partial DASA databases are capable of functioning in an independent and/or collaborative manner, wherein the master and partial DASA databases allow for bi-directional transmission of data exists within, along or external to one or more securitized blockchains with multiple partial user devices and with multiple partial access devices wherein the devices store and provide at least partial copies of portions of the master DASA database and wherein the master and/or partial DASA databases are linked and communicate and utilize one or more securitized blockchains with one or more logging and monitoring databases capable of statistical and numerical calculations utilizing the data, wherein the system authenticates using a first set of rules, validates using a second set of rules, and wherein a third set of rules controls access for a specified set of users.

In addition, the master and partial DASA databases analyze and provide information in a form of data and act to control one or more output devices, wherein the output devices can create user devices and wherein the securitized blockchains are securitized by implementation of the access control system.

Partial user devices and the partial access devices are independent and capable of completing required operations that utilize one or more securitized blockchains without a need for other partial user devices and partial access devices.

The partial user devices and the partial access devices can be networked and cooperate to complete any required operation within, along or external to one or more blockchains that are not securitized.

This system includes at least one virtual user device that provides a separate storage and retrieval location which is utilized in a sequential manner such that the virtual user device is not physical but operationally made to appear as if it is a physical device and wherein the virtual user device exists within, along or external to one or more blockchains.

The virtual user devices provide data that are within, along or external to one or more blockchains for the access devices such that the virtual user devices functionality is provided via the access devices.

The access devices act upon the user devices that exist within, along or external to one or more blockchains and are capable of distinguishing a physical user device from a virtual user device.

The access devices can utilize user devices without any need to distinguish one or more physical user devices from one or more virtual user devices.

The virtual user device requires utilization in sequence unless tolerance allows rules for out of sequence usage.

In addition, the logging and monitoring databases exist within, along or external to one or more blockchains and includes temporal aspects regarding the data.

In some cases partial DASA databases operate independently and utilize a designated portion of a user's record existing within the partial DASA databases that exists within, along or external to one or more blockchains and ultimately the partial DASA databases operate within the master DASA database.

In addition, the partial DASA databases are capable of storage and retrieval of data but are not required to perform data manipulation with computational operations.

The user devices transmit data that exists within, along or external to one or more blockchains and are not required to perform computational operations, and wherein one or more user devices are selected from a group consisting of; tickets, chits, tokens, RFID tags, radio, electrical, magnetic, electromagnetic and radiative tags, wavelengths of optical and wavelengths of sonic energy tags.

Transmission of data is transmitted via signals that exist within, along or external to one or more blockchains.

Signals are generated via at least one form of energy selected from any one or more of the group consisting of; electrical, optical, mechanical, chemical, magnetic, radiative, electro-optical, electro-mechanical, electro-chemical and electro-magnetic energy.

In another embodiment, the access control system works according to a first set of rules, authentication attempts utilize a designated portion of the user's record such that the first set of rules invoke constantly changing the designated portion within the user's record of the auto-synchronous DASA database that exists within, along or external to one or more blockchains.

Here, non-authentication events do not cause constant changing of the designated portion of the user's record within the DASA database.

Non-authentication events are recorded as well as authentication events are recorded.

After authentication, validation occurs according to the second set of rules wherein a subset of data with user specific information exists within the designated portion of the user's record, such that validation requires retrieving, analyzing, utilizing and storing the subset of data that exists within, along or external to one or more blockchains and that is subsequently changed when validation of specific data within the subset occurs.

Validation provides allowance to attempt access.

In a further embodiment, after authentication and validation, the third set of rules are invoked, so that access and denial is a recorded event that is stored and resides within user's records wherein the records exist within, along or external to one or more blockchains.

If access is granted, verification is provided indicating access occurred.

When the third set of rules are invoked, access and denial is a recorded event stored in the logging and monitoring database(s) that exists within, along or external to one or more blockchains and wherein the logging and monitoring database is separate from the DASA database.

For the recorded event, n numbers of events influence future access and denial of the specified set of users. After n events, access is denied until temporal rules re-enable access.

The temporal rules are invoked via utilization of elapsed time that is accessed from the user device, the access device, or an external source wherein the user device, access device and external source exist within, along or external to one or more blockchains and are capable of temporal measurement.

The temporal rules are invoked via utilization of calendrical and associated clock time accessed from either the user device, the access device, or the external source.

If access to a specified set of users is allowed but the specified set of users decides not to gain access, use of an entry code is not reusable and if entry is provided but not utilized, eventually too many access attempts are recorded, resulting in denial of access.

Each attempt for access causes a new code be generated from either one or more blockchains or the auto-synchronous DASA databases and provides for each attempt, thereby each attempt results in an ability to encrypt a different encryption for and of the data, the data transmission, and the new code wherein the data, data transmission and new code exist within, along or external to one or more blockchains The third set of rules provides degrees of access that are either incomplete or allow for partial access.

The third set of rules is combined with using logic embedded within the user devices or the access devices (or possibly both), wherein the user devices and/or the access devices are smart devices in that the smart devices are capable of at least one of a set of functions selected from a group consisting of; acquisition, analysis, storage and retrieval of the data and wherein the smart devices exist within, along or external to one or more blockchains and wherein the devices are virtual or real devices.

For the DASA database and or the blockchain, the designated portion of the user's record utilized corresponds with only a single user.

The DASA database resides on a server that communicates with one or more computers or computerized equipment that are within, along or external to one or more blockchains.

The DASA database is generated with one or more computerized computations and wherein the DASA database possesses technology limited size regarding data memory storage and data micro-processing speeds and wherein a fraction of the DASA database is utilized during any data transaction and wherein the data transaction can exist within, along or external to one or more blockchains.

In many embodiments, at least one encryption application that exists and is located within, along or external to one or more blockchains and/or within the DASA database and wherein the encryption application possesses one or more keys.

In a further embodiment, data transmission from the user device is encrypted with the keys and the data transmission is received by the access device and decrypted with the keys which may be randomly dynamically changing keys.

The one or more keys are generated with one or more computerized computations or algorithms from a subset of data that exists within, along or external to one or more blockchains with user specific information existing within a designated portion of the user's record of the auto-synchronous database such that authentication is implemented according to a first set of rules, wherein the first set of rules also includes encryption and decryption.

One or more keys are generated with one or more computerized computations or algorithms from a subset of data that exists within, along or external to one or more blockchains with user specific information existing and residing outside the designated portion of the user's record of the auto-synchronous database such that authentication occurs according to the first set of rules wherein the first set of rules includes encryption and decryption.

The encryption application is secured in a secured database within a secured cloud or other secured computer aided storage systems that utilize one or more of the group selected from a computer accessible cloud, network, internet, intranet, within, along or external to one or more blockchains and at least one server.

The encryption application employs at least a single level encryption process as follows;
a first level of encryption and decryption of data transmission that exists within, along or external to one or more blockchains, utilizing keys wherein a first set of encryption keys exist and are retrieved from one or more encryption applications, the applications existing within one or more databases or data storage devices or securitized blockchains containing the encryption keys, wherein a user accesses and utilizes at least a single key that exists in both the user device and the access device that exist within, along or external to one or more blockchains via utilization of the distributed auto-synchronous array (DASA) database that exists for and is accessible by both virtual and real user devices and the access devices, wherein at least the single key exists within all devices, thereby alleviating a need to distinguish between user ID's;
a second level of encryption and decryption of data transmission utilizing keys wherein at least one user ID is attached to the data that exists within, along or external to one or more blockchains and wherein the user ID must be placed within an unencrypted portion of the data such that the user can access and acquire at least one key from the user record but not out of the encryption application, such that every user possesses their own key and an unencrypted user ID in received data is utilized to select one or more user's data records such that the at least one key from the one or more user's data records is utilized; and wherein the user ID attached to the data is attached via a tag of the data and;
wherein a third level of encryption and decryption of data transmission that exists within, along or external to one or more blockchains utilizing keys provides for multiple user records that exist for multiple users wherein the user can access and acquire said keys wherein said keys residing within said DASA database and/or blockchain are constantly changing thereby requiring smart user devices that can utilize these constantly changing keys;
a fourth level of encryption and decryption of data transmission that exists within, along or external to one or more blockchains utilizing keys wherein the keys are located in an expanded data record field within a range of data records so that the designated portion of the expanded data record field is utilized wherein the keys are in a first record of the designated portion providing one or more unique keys for every data transmission.

In most cases, the designated portion is constantly changing.

In some embodiments, a fifth level of encryption and decryption of data transmission exists within, along or external to one or more blockchains and utilizes keys such that computerized computations produce keys from any combination of a group consisting of; record numbers, recorded time, and random numbers associated with the user record and wherein one or more algorithm produced keys exist and allow for generation of an identical key using an identical algorithm for decryption wherein the keys exists within, along or external to one or more blockchains.

For the fifth level of encryption one or more algorithm produced keys exist within the DASA database and/or within, along or external to one or more blockchains In most cases, each and every instance of transmitting data within, along or external to one or more blockchains generates a new set of keys (one or more pairs) without transmitting the new set of keys from the user device(s) to the access device(s).

In the absence of transmission of the new set of keys it is impossible for interception of the new set of keys without access to the DASA database and/or access to the one or more blockchains wherein the blockchains themselves may or may not be securitized with the encryption application.

For all levels of encryption, if data fields are picked that are changed during use of the user device, it is impossible to intercept the keys without access to the DASA database and/or said one or more blockchains. The DASA database and the one or more blockchains or one or more DASA databases themselves are encrypted to protect against unauthorized access of the DASA database and/or said one or more blockchains.

The protection of data from or within one or more DASA databases and/or within, along or external to one or more blockchains is provided by utilizing a system key for each user to be allowed access to the system.

For the designated portion of a user's record the tolerance of the designated portion is provided when data is in transit from the designated portion to the access device and wherein transit of the data is synchronized between the user device and the access device and wherein data in transit exists within, along or external to one or more blockchains.

For the designated portion of a user's record according to said first set of rules defining authentication, the first set of rules also relate to, correspond with, and/or invoke tolerance rules that search for an access device's data record regarding data sent by the user device and also the access device's data exists within, along or external to one or more blockchains.

For the entire access control system when data in transit is not synchronous and when the data is transmitted outside of a predetermined and limited tolerance, no authentication can be achieved.

For this same system, when synchronization is not occurring, resynchronization is achieved by changing the designated portion during access to the access device to match the designated portion of the user device, thereby achieving resynchronization.

When resynchronization occurs the user ID is utilized to select the user record according to the third set of rules, thereby allowing the user record to be accessed from a known portion of one or more DASA database(s) and/or from one or more blockchains and wherein resynchronization recognizes the specified set of users to ensure proper resynchronization in order that the access device can properly allow or deny access for the specified set of users.

During a process of trying to authenticate, a user must decrypt each data record within the designated portion that possess its own unique key and wherein the process continues until the user finds a match of the data record with the key and wherein the key resides within, along or external to one or more blockchains.

The tolerance provides a desired range within which the system operates and the tolerance utilizes one or more record numbers via one or more computerized computations that encrypt and decrypt data and wherein the computerized computations exist within, along or external to one or more blockchains.

The tolerance is increased in complexity by applying a more stringent check of additional records within a designated portion of the user and access devices that exist within, along or external to one or more blockchains, along with temporal limitations that limit authentication thereby increasing security.

The first attempts to access a secure device or location begins by acquisition of one or more keys that utilize a complex tolerance provides for a number of attempts (n) to retrieve keys from a configuration table that exists within, along or external to one or more blockchains and wherein the encryption application with a get next key routine is invoked locally on or in proximity to the user device to generate encryption keys as well as to generate a new master key and wherein simultaneous attempts are made to match the user's device user identification (ID) encryption keys with an encryption database derived from user ID encryption keys by using a specific tolerance number/range selected from many numbers (n) available through an algorithmic number generator that exists within, along or external to one or more blockchains.

Here, an encryption application has been added for layering security required for the system so that a match is determined to establish whether a user of said user device has access privileges.

All encryption keys can be removed from a user table either, before, during, or after the match such that a key management system exists within, along or external to one or more blockchains to ensure that the keys themselves are neither discoverable nor compromised.

The DASA databases include a list of identifiers and codes that may reside in either user devices or access devices or within both devices and/or also exist within, along or external to one or more blockchains, such that the access control system includes a device that functions as two or more devices; one a user device and another an access device, both possessing matching databases that communicate with each other and utilize one or more encryption applications wherein the matching databases exist within, along or external to one or more blockchains.

In at least one embodiment, the access device is a reader device. In at least another embodiment, the reader device is a badge reader.

In several embodiments, the user device communicates internally within the user device and externally from the user device by transmitting and receiving data utilizing one or more encryption application(s) that exists within, along or external to one or more blockchains and a secured location and wherein the reader device is a detecting device that searches, retrieves, and analyzes a recognizable securitized and encrypted data signal that exists within, along or external to one or more blockchains generated after installation of the encryption application(s) is completed.

In some cases, the data is contained within a token that exists within, along or external to one or more blockchains.

The token can be recognized by a reader device that controls access to an entrance into the user device and controls access to an entrance into the reader device and also controls access to one or more locations.

The data that exists within, along or external to one or more blockchains is provided as code, the code being selected from the group consisting of; a QR code, a bar code, a digital code, an analogue code, and a 7-bit binary code.

In some embodiments, one or more user devices and one or more access devices are data transceiver devices wherein said user, access, and transceiver devices all can exist within, along or external to one or more blockchains.

In a further embodiment, the transceiver is intelligent and the receiver is intelligent in that the transceiver and receiver are computerized and possess memory.

The user device may be selected from a group consisting of cellular phones, cameras, infrared transmitters, optical transmitters, Wi-Fi_33 transmitters, Bluetooth transmitters, ultra-wide band nearfield transmitters, communication transmitters, radiation transmitting devices, magnetic strips, and smart chips.

The user devices and access devices may contain sensors selected from the group consisting of RFIDs, gyro sensors, magnetic field sensors electromagnetic field sensors, electrical optical infrared sensors, radar sensors, lidar sensors, inclination accelerometers, inclinometers, cameras, and biosensors.

In some cases, the access device is a cellular phone. It is also possible that the access device is a cellular phone that contains a camera.

In many embodiments, the cellular phone is a smart phone in that it can access, interact with, and display internet provided data as well provide GPS guidance and allow for computational search, retrieval, and analysis of data derived from, residing within, or accessed by the smart phone.

For many cases, the access devices are further selected from the group consisting of; controllers and switches that control a flow of energy in signal form to and from devices including; lights, all forms of transportation vehicles including aerospace vehicles; elevators and escalators, electrical switches, and electrical contacts and wherein the controllers and switches are further selected from the group consisting of; rheostats, thermostats, and transformers, wherein the controllers and switches are selectively manipulated to operate and control the devices within a specified range.

The access system can be local and exist within, along or external to one or more blockchains. Likewise, the access system can be remote and exist within, along or external to one or more blockchains.

In some embodiments, one or more QR codes found by the access device is recognizable in that it is recognized by the user's cellular phone and thereby allows access to a User Identification (ID) encryption key from the QR code which is subsequently passed through said encryption application.

Simultaneously, the access device sends a message in the form of a group consisting of an; oral, verbal, text, and data message that is displayed and specifically states "attempting encryption match".

In addition, the present disclosure and associate inventiveness can be described as one or more combined devices that encrypt data that exists within, along or external to one or more blockchains and is transmitted to and/or decrypts data received from the devices that utilize one or more master keys comprising;

one or more combined devices that encrypt data transmitted to and/or decrypt data received from one or more blockchains and the devices that utilize one or more master keys comprising;

at least one encrypter and/or decrypter such that encryption and/or decryption of the data and/or associated data files utilize both master keys and one or more key selectors, wherein the master keys and key selectors produce a specific set of one or more encryption keys that encrypt and/or decrypt the data and/or associated data files such that one or more key selectors coincide with at least one value that directly corresponds with created cipher data and/or cipher data files, and wherein the key selectors can also be encrypted and decrypted, and wherein the key selectors and the cipher data and the cipher data files produces result data and result data files such that the cipher data and cipher data files together with the result data and result data files are sealed in that produced encrypted data and encrypted data files can only be encrypted and decrypted with one or more master keys and one or more key selectors, wherein the master keys are executable coded cipher keys and wherein the data is a form of transmission(s) that can also be signals within, along, and/or external to one or more blockchains and wherein the one or more devices further comprises;

a forward error correction encoder that encodes transmission(s) and provides a known degree of forward error correction to said transmission(s);

a sub-channel encoder;

a transmission(s) combiner that combines transmission(s) from the forward error correction encoder with transmission(s) from the sub-channel encoder;

a transmission(s) encrypter that receives combined transmission(s) from the transmission(s) combiner, wherein the transmission(s) encrypter receives one or more encrypter keys (KE) and the combined transmission(s), such that the combined transmission(s) are encrypted by the transmission(s) encrypter and sent to a transmission(s) transmitter and wherein the transmission(s) are in a form of cipher text;

a transmission(s) receiver that receives the cypher text and sends the cypher text to a transmission(s) decrypter, such that the cypher text is decrypted and wherein the devices further comprises;

at least one executable coded cipher key(s), and at least one executable coded encryption key (ECEK) device that encrypts transmission(s) that uses executable cipher coded key(s), and at least one executable coded decryption key (ECDK) device that decrypts transmission(s) that also uses at least one executable coded cipher key(s), such that a combined device is a RDDS/ECDK device that transmits randomized encrypted data with data sub-channels and with executable coded encryption keys;

at least one computer processing unit (CPU) with computational capabilities that is connected to and controls a computer memory via an address bus and a data bus such that the address bus accesses a designated range of computer memories and range of memory bits and the data bus provides for a flow of transmission(s) into and out of the CPU and computer memory, and wherein the computer memory contains encrypter/decrypter memory that possesses at least one encryption space and at least one decryption space for the executable coded cipher key(s), such that transmission(s) is sent to the encrypter/decrypter memory that stores the transmission(s) within, along or external to one or more blockchains while the transmission(s) is encrypted and/or decrypted, and wherein, when encryption/decryption is completed the transmission(s) within, along or external to one or more blockchains is sent to at least one transmitter such that encryption/decryption of said transmission(s) is controlled and manipulated by the executable coded cipher key(s), wherein the executable coded cipher key(s) remain in the computer memory long enough to achieve encryption/decryption completion wherein the completion provides for one or more securitized blockchains.

In some embodiments, the executable cipher keys can contain meta data.

The devices can provide encryption and decryption that can reside in and be utilized by one or more real or virtual master distributed auto-synchronous array (DASA) database DASA databases, wherein a computer enabled access control system further comprises; a real or virtual master distributed auto-synchronous array (DASA) database that at least stores and retrieves data and that includes at least two or more partial distributed auto-synchronous array (DASA) databases wherein the partial DASA databases are capable of functioning in an independent and/or collaborative manner, wherein the master and partial DASA databases allow for bi-directional transmission of data with multiple partial user devices and with multiple partial access devices wherein the devices store and provide at least partial copies of portions of the master DASA database and wherein the master and/or partial DASA databases are linked and communicate with one or more logging and monitoring databases capable of statistical and numerical calculations utilizing the data, wherein the system authenticates using a first set of rules, validates using a second set of rules, and wherein a third set of rules controls access for a specified set of users.

The databases that reside within, along, or external to one or more blockchains, analyze and provide information in a form of data and act to control one or more output devices, wherein the output devices can create user devices.

The partial user devices and the partial access devices that reside within, along, or external to one or more blockchains are independent and capable of completing required operations without a need for other partial user devices and partial access devices.

BRIEF DESCRIPTION OF THE DRAWINGS

So that the above recited features and advantages of the present disclosure can be understood in detail, a more particular description of the invention and reference to embodiments are provided and illustrated in the appended figures. It is to be noted, however, that the appended drawings illustrate only typical embodiments of the present disclosure and are therefore not to be considered limiting the scope or other equally effective embodiments.

So that the above recited features and advantages of the present disclosure can be understood in detail, a more particular description of the invention, reference to embodiments are provided and illustrated in the appended figures. It is to be noted, however, that the appended drawings illustrate only typical embodiments of the present disclosure and are therefore not to be considered limiting scope or other equally effective embodiments.

DETAILED DESCRIPTION

While the foregoing discussion has dealt primarily with detecting unauthorized communicating devices, the present invention may also include the ability to detect unauthorized users. In many applications, including credit card authorization and approval and cellular telephone communications, it is frequently desirable to verify that the communication is being initiated by an authorized user. The inclusion of a user authorization system is beneficial for reducing the use of authentic communicating devices when they have been stolen or lost. Losses due to the use of lost or stolen communicating devices is also very significant, but is inherently limited to the capacity of the authorized communicating device itself, i.e., one communication at a time, a credit limit, etc. Furthermore, the use of lost or stolen communicating devices by unauthorized users may be restricted by the use of user (transaction) specific codes (TS codes), such as a personal identification number (PIN), finger print, password, voice commands and the like.

Figure 1:
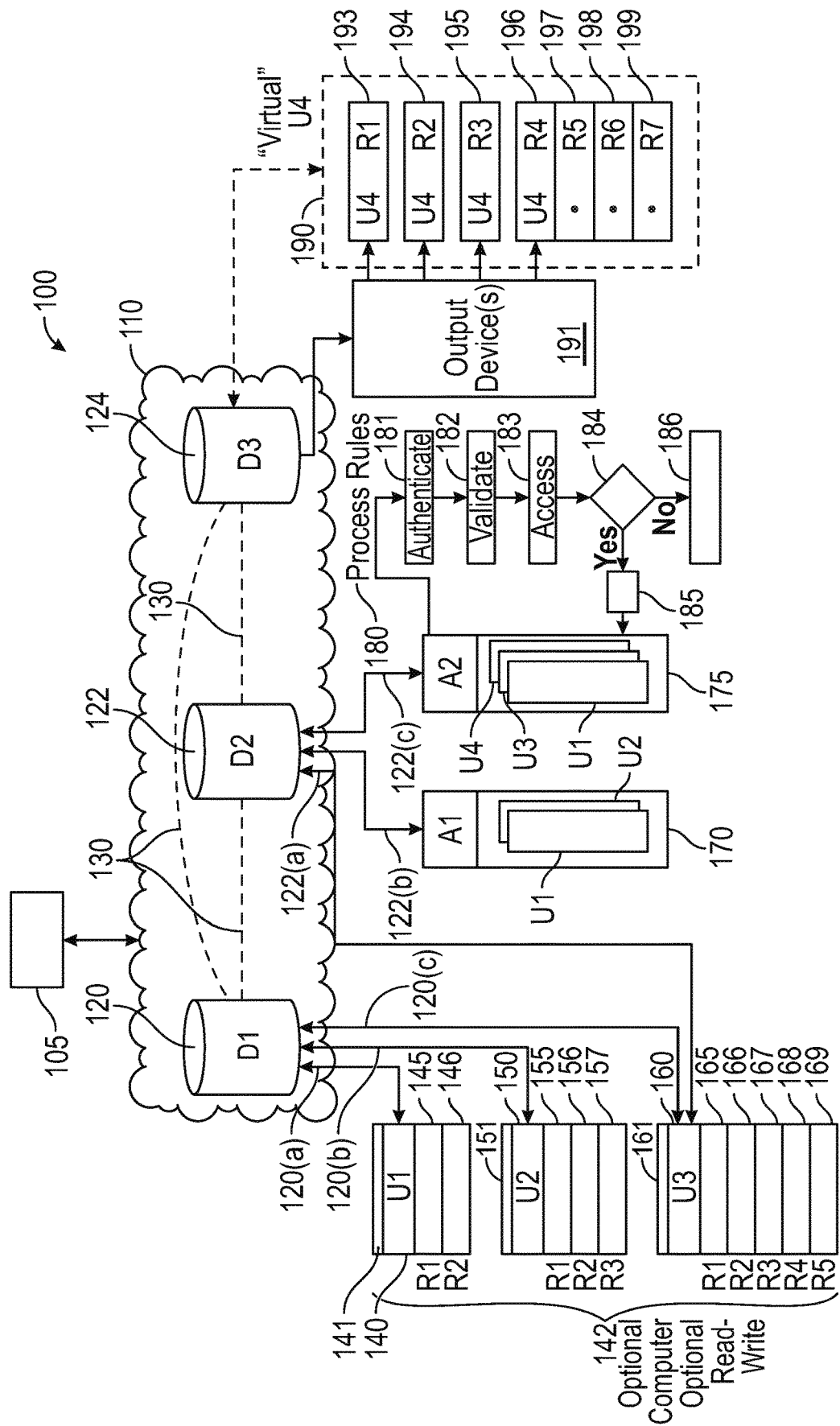
FIG. 1 is a schematic which provides at least one embodiment of the computer enabled access control (securitization) system, which contains, in this instance, a real or virtual master distributed auto-synchronous array (DASA) database.

Specifically, FIG. 1 is a schematic which provides at least one embodiment of the computer enabled access control (securitization) system (100), which contains, in this instance, a real or virtual master distributed auto-synchronous array (DASA) database (110), depicted as a cloud, that at least stores and retrieves data and that includes at least two or more partial distributed auto-synchronous array (DASA) databases D1, D2, D3, shown as (120, 122, and 124) so that the partial DASA databases 120(D1), 122(D2), and 124 (D3)) are capable of functioning in an independent and/or collaborative manner (130), and such that the master DASA database (110) and partial DASA databases (120, 122, and 124) allow for bi-directional transmission of data, shown as (120a), (120b), and (120c) for 120 (D1) as well as for 122 (D2) with transmissions (122a), (122b), and (122c). Simply for the purposes of illustration, these transmissions are shown to be different than the transmissions shown to exist for (124), D3 as will be further explained below. It should be noted that the D3 transmissions can be identical to those of D1 and/or D2 and that multiple databases D1 . . . Dn can exist.

The multiple partial user devices U1, U2, U3 are shown as (140), (150), and (160) respectfully. The multiple partial user devices in this instance include 2 sets of records in U1(140); U1R1(145) and U2R2 (146), 3 set of records in U2(150), U2R1(155), U2R2(156), and U2R3 (157), and 5 sets of records in U3 (160); U3R1(165), U3R2 (166), U3R3(167), U3R4 (168), and U3R5 (169). Each of these user devices contains optional computing capabilities (141, 151, and 161) that also provide for overall optional read/write functionality (142). Multiple partial access devices (A1—170 and A2—175) exist that can store and provide at least partial copies, U1 (140) with a set of records U1R1 and U1R2—(145,146), U2 (150), with sets of records U2R1, (155), U2R2, (156), and U2R3, (157). Access device A2 (175), in this case possesses 3 sets of records, U1 (140), with records U1R1, (145) and U1R2, (146), U3, (160), with 5 sets of records U3R1 through U3R5; (165-169) and U4 (190), which is a virtual user device, that in this instance contains 7 records, U4R1 through R7 that are represented as U4R1 (193), U4R2(194), U4R3(195), U4R4(196), U4R5(197), U4R6(198), and U4R7(199). The virtual user device, U4 (190) is created by output device(s) (191) e.g. printers, scanners, tokens, stamps, RFID tags, encoders, wave scanners, electromagnetic devices, etc. which subsequently create virtual user devices (U4). In other cases, it is possible that these user devices could be a collection of both real and virtual user devices that also can be connected to a partial database D3 (124).

In this case, virtual U4 (190), U4R1 (193) is a printed bar code ticket that could be provided in a paper or electronic format. U4R2 (194) is a QR code printed on a more durable plastic medium or electronic format. U4R3(195) is an electronic record sent to a user's personal smart display device (e.g. an application on a cell phone) which displays a QR code on its screen. U4R5-U4R7 (196-199), in this case are RFID tags that provide for bi-directional nearfield communications. Each of these records within the virtual U4 device (190) are produced by appropriate output devices (191) for each media type. In the case of U4R3(195) which is for a "smart" or intelligent application and for U4R4-U4R7 (196-199) which is a read-write device, these records can be distinguished from a single photographic copy so that only the designated users/user devices can possess the authentic and validated records. The read-write capability allows for verification of the actual token, which is not possible for records U4R1(193) and U4R2(194), which are simple images. The simple images must still be used in sequence, in a single instance, unless tolerance rules provide otherwise.

Here the master DASA database (110) and/or partial DASA databases (120, 122, and 124) are linked and communicate with one or more logging and monitoring database(s) (105) capable of statistical and numerical calculations utilizing or otherwise involving the data. An alarm function can also be implemented with or without the assistance of temporal devices (such as clocks and other timepieces).

FIG. 1 also provides, as an example, a set of process rules which are carried out directly or indirectly as computer operations (180) that are followed to authenticate (181), validate (182) and determine access (183) for user devices. These rules apply to all access devices, including access devices, A1 (170) and A2 (175). There can be, and often are, different rules that should be followed for other access devices. The flow path provided indicates that the access device(s) authenticates (181) using a first set of rules, validates (182) using a second set of rules, and includes a third set of rules that controls access (183) using data that has been supplied by the user devices to ensure access to only a specified set of users under specified conditions.

The process rules are finalized with an access decision (184) which includes at least two options. One option is an access decision (185) that includes the process of allowing user access and verifies the user has invoked their privileges. This may include, for example, physical access such as opening doors or logical access such as unlocking data within databases or communication systems. Normally the user would be alerted to the system when allowing access. The user's activity then may be monitored by the access process to ensure that they have utilized their access within certain limitations. Physical limitations may be provided by enabling door monitoring switches, floor-mats, man traps, video analysis, etc. Logical limitations may be monitored by keyboard and/or data access and the like. Temporal limitations may be employed as required. Access may further be limited by counting the number of access/egress attempts. In the case of access denial (186), the user will be normally notified of the denial of access and optional alarming may take place. Reporting of the activity is normally returned from the access device(s) (e.g. 170, 175) to the master DASA database (110), which also provides for logging the data, meta-data and associated information to the external logging and monitoring database (105).

Figure 1A:
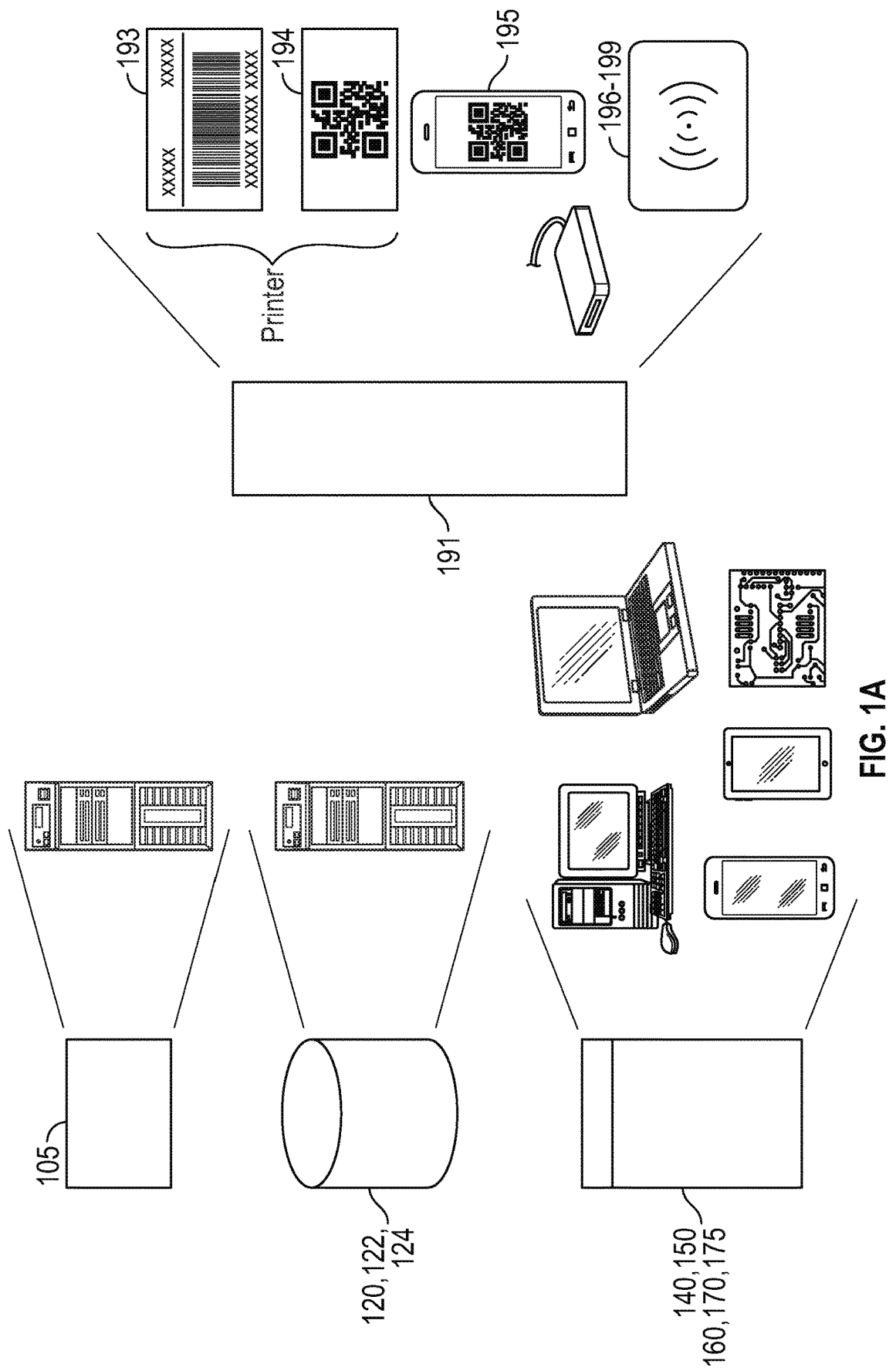
FIG. 1A is a schematic diagram that further illustrates and demonstrates actual and various devices using exploded views depicted in FIG. 1.

FIG. 1A further illustrates and demonstrates actual and various devices using exploded view callouts from that depicted in the schematic diagram shown in FIG. 1 and described above. Specifically, (105), the monitoring database, is shown as linked, residing within, and/or processed by a server or other computer microprocessor(s). In addition, the DASA database (110) and/or partial DASA databases (120, 122, and 124) are linked and communicate with the same or different (in some cases hardware) server(s) or other computer microprocessor(s). In addition, the multiple partial user devices U1, U2, U3 shown as (140), (150), and (160) respectfully, as well as the multiple partial access devices, (170), (175) are shown as one or more of several hardware devices including a desktop computer terminal and hard drive, a laptop computer, a cellular or smart phone, a tablet, such as an iPad®, and even a printed circuit board or integrated circuit (IC).

Further, elaborating on the virtual user device, U4 (190) as described above, can be created and are shown as real output device(s) (191) e.g. printers, scanners, tokens, stamps, RFID tags, (193,194) existing on or in cell phones or scanners (195) and/or functioning encoders, wave scanners, and/or electromagnetic devices (196-199). It is important to understand that these real devices can be used to create virtual user devices (U4).

Figure 2:
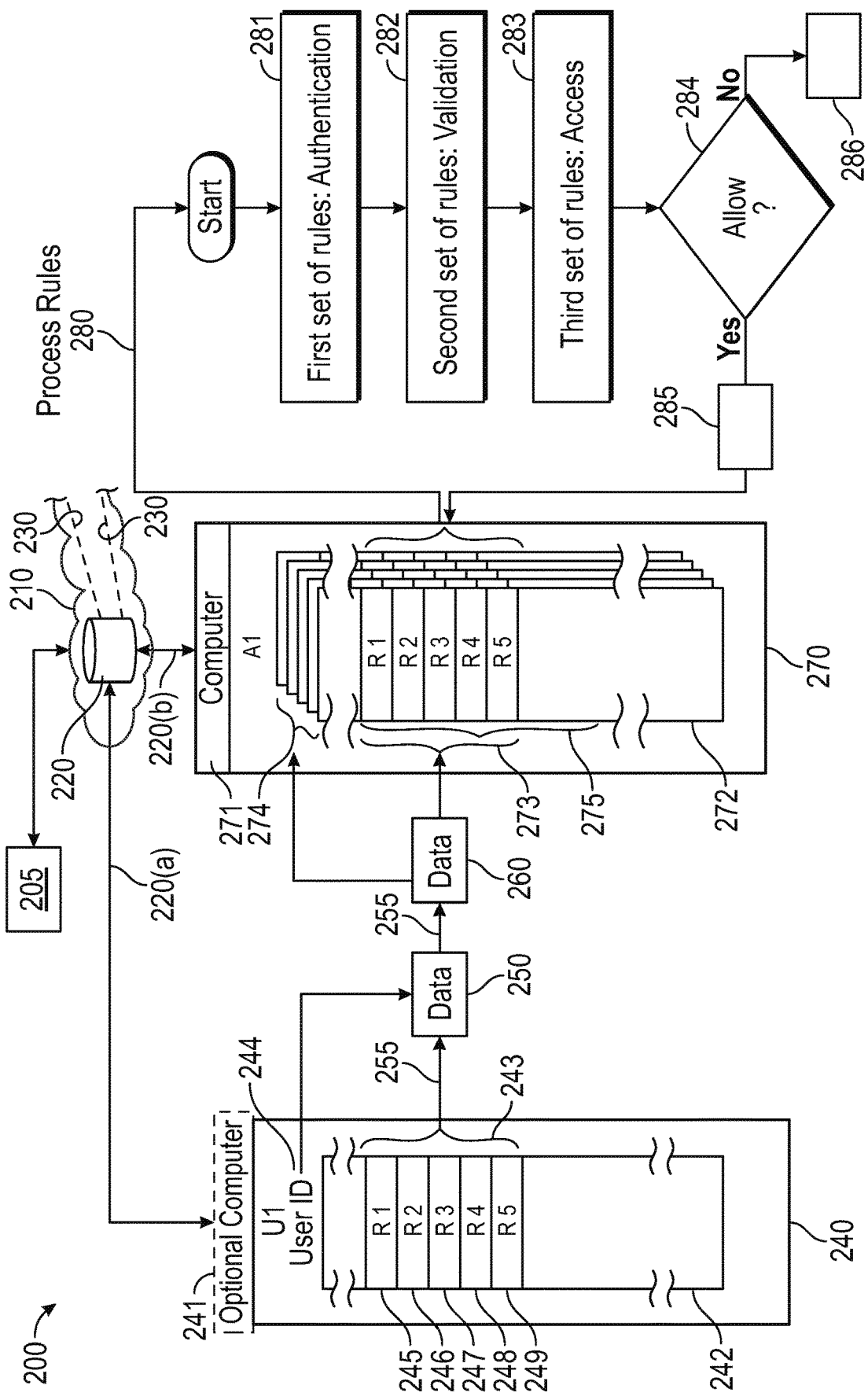
FIG. 2 is a schematic that details a basic configuration regarding an example operation utilizing a real or virtual master DASA database shown as a partial cloud containing additional partial DASA databases wherein the partial DASA databases are capable of functioning in an independent and/or collaborative manner and also wherein the master DASA database and partial DASA databases allow for bi-directional transmission of data.

FIG. 2 is a schematic (200) that details a basic configuration regarding an example operation utilizing a real or virtual master DASA database (210) shown as a partial cloud containing additional partial DASA databases (220) wherein the partial DASA databases are capable of functioning in an independent and/or collaborative manner (230), wherein the master DASA database (210) and partial DASA databases (220) allow for bi-directional transmission of data, shown as (220 *a* and 220 *b*).

In this case, a single partial user device, U1, (240), includes 5 records (R1 245, R2 246, R3 247, R4 248, R5 249). The user device (U1) contains optional computing capability (241) and also contains a user ID (244). The 5 records in this case represent a designated portion of records (243) that together are a designated portion of a real or virtual, fuller list of records (242). The records (R1 245, R2 246, R3 247, R4 248, R5 249) minimally contain transaction sequence codes (TS codes) from the partial DASA databases (220). When the user device (240) requests access, the user device (240) includes a transmitter (250) that transmits data (255). The transmitted data (255) consists of an identifier of the specific user access device with its user ID (244) and the specific TS code contained in the most current record, R1, (245) in the designated portion (243). The transmitted data (255) not only contains user ID (244) and TS code(s) but also may comprise meta-data as well as additional information before, during, and after data transmission.

The transmitted data (255) is received by a receiver (260) that provides reception for a data transmitter (250) of an access device (270). The access device includes a computing portion (271) and a partial list of multiple real or virtual records (272) from the partial DASA databases (220). The received data from the receiver (260) is retrieved, analyzed, and acted upon by the computing portion (271). The User ID portion (244) of the data is used to select a specific record (274) from the partial list of multiple real or virtual records (272).

At this point, process rules (280) regarding authentication, validation, and access are invoked. The first set of rules for authentication (281) begin by taking the TS code(s) from the data which is next compared to TS code(s) in the designated portion of the specific record (273). This procedure corresponds to what is often referred to as a "dynamic table look-up" methodology. In contrast, if the TS (transaction specific) code(s) are not found, the record match fails, and then further authentication processes may be invoked.

Authentication can also include broadening/expanding of the designated portion (273) and searching for a match in the broader designated portion (275). It is possible to request multiple TS codes from the user device (240) using bi-directional transmission of signals to communicate and ensure that proper authentication is maintained.

In addition, it is possible to mark the currently used matched record as the beginning of the new designated portion, thereby synchronizing and constantly changing the designated portion (273) of the records (272) of the access device (270) with the user device (240) and voiding the use of all earlier records for a specific user device (240)

If all of the authentication processing fails, then the process rules flow truncates and optionally the user device (240) is notified.

When the authentication (281) is completed, validation (282) begins. If a match of TS codes in the designated portion (273) are found and the record (274) has not been utilized or utilized less than n times, validation (282) continues.

As validation (282) continues, it is useful to indicate that a matching record has been utilized and the "n" times counter begins to increment. In this instance, temporal codes stored in the user's record (274) maybe compared with other items including; related temporal events, the last attempt to validate, the last attempt to access, and other possible options. Validation (282) requires retrieving, analyzing, utilizing, and storing a subset of data from the user record (274) that is subsequently changed when validation (282) of specific data within the subset occurs. The subset of data from the user may contain biometric, financial, medical, challenge responses, and the like. Successful validation (282) provides allowance to attempt access (283). After authentication (281) and validation (282) a third set of rules, access (283) are invoked, so that access and denial is a recorded event that is stored and resides within a user record (274). The recorded event can be stored in the logging and monitoring database (205) that is separate from the master (210) and partial (220) DASA databases. Here, n numbers of events influence future access and denial of a specified set of users. After n events, access is denied (284) until temporal rules re-enable access (286). In the case of access being allowed (285), temporal access rules are invoked via utilization of elapsed time that is accessed from the user device (240) the access device (270), or an external source capable of temporal measurement. Temporal rules are invoked via utilization of calendrical and associated clock time accessed from either the user device (240), the access device (270), or an external source. If access to the specified set of users is allowed but the specified set of users decides not to gain access (285), use of an entry code is not reusable and if entry is provided but not utilized (285), eventually too many access attempts are recorded, resulting in denial of access.

Each attempt for access causes a new TS code be provided from the user device (240) and provides for each attempt. The third set of rules provide degrees of access that result in either incomplete or partial access. Also, the third set of rules is combined with using logic embedded within the user devices (240) or the access devices (270) or both, wherein the user devices (240) and/or the access devices (270) are smart devices in that the smart devices are capable of at least one of a set of functions selected from a group consisting of; acquisition, analysis, storage, and retrieval of the data.

During the processing, or at the completion of the process rules (280), the records in the access device(s) (270) are updated with the process progress. The user record(s) (274) is updated and provided back to the partial DASA database (220). This update may then be provided to the logging and monitoring database (205). In addition, the user device(s) (240) could act as smart devices with a computer that updates the partial DASA database (220) and likewise the update may then be provided to the logging and monitoring database (205).

Figure 3:
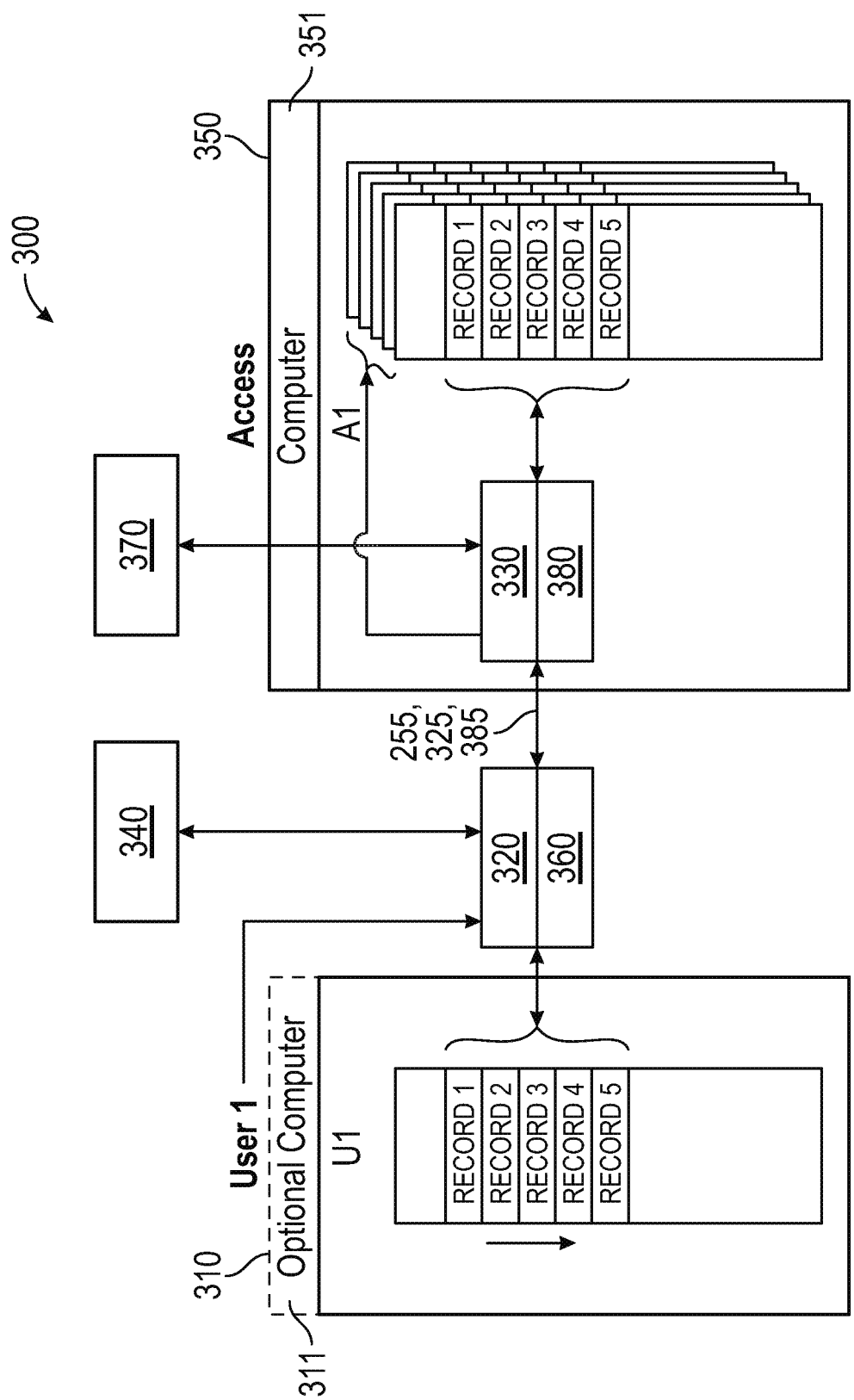
FIG. 3 is a schematic that describes bi-directional communication between a user device U1 and an access device A1 where the user device U1 must include at least one computer. In the case of FIG. 3, the bi-directional access control system provides bi-directional transmissions connected to the DASA databases.

FIG. 3 is a schematic that describes bi-directional communication between user device U1 (310) which corresponds to (240) in FIG. 2 and an access device A1 (350) which corresponds with (270) in FIG. 2, wherein the user device U1 (310) must include at least one computer (311). In the case of FIG. 3, the bi-directional access control system (300) provides bi-directional transmissions connected to the DASA databases as described in FIGS. 1 and 2 above. In this case, transmitted data (255, as shown in FIG. 2) is transmitted between two controller devices (310,350), either one of which may be a user and/or access device with computers (311, 351). In order to function, controller device (310) includes a transmitter (320), a receiver (330) and rules processor (340) that may or may not utilize computer (311). Likewise, in order to function, controller device (350) includes a transmitter (380), a receiver (360) and rules processor (370) that may or may not utilize a computer (351). Controller (310) assembles data beginning in the transmitter (320) and transmits the data (255) as signals in transmission path (325) which are received by controller's (350) receiver (330) and processed by rules processor (370).

Also shown, is another controller (350) that assembles data in the transmitter (380) and transmits the data (255) as signals in transmission path (385) which are received by controller's (310) receiver (360) and processed by rules processor (340).

The data flow direction will be specific to the requirements of the system (300) and normally different data will be transmitted (255) and processed under a different set of rules created and processed by the rules processor(s) (340, 370). This system (300) provides a full-duplex arrangement allowing for data (255) flow in each direction simultaneously over two separate data paths (325, 385) which may exist in the same virtual/physical/real space or different virtual/real/physical spaces.

Figure 4:
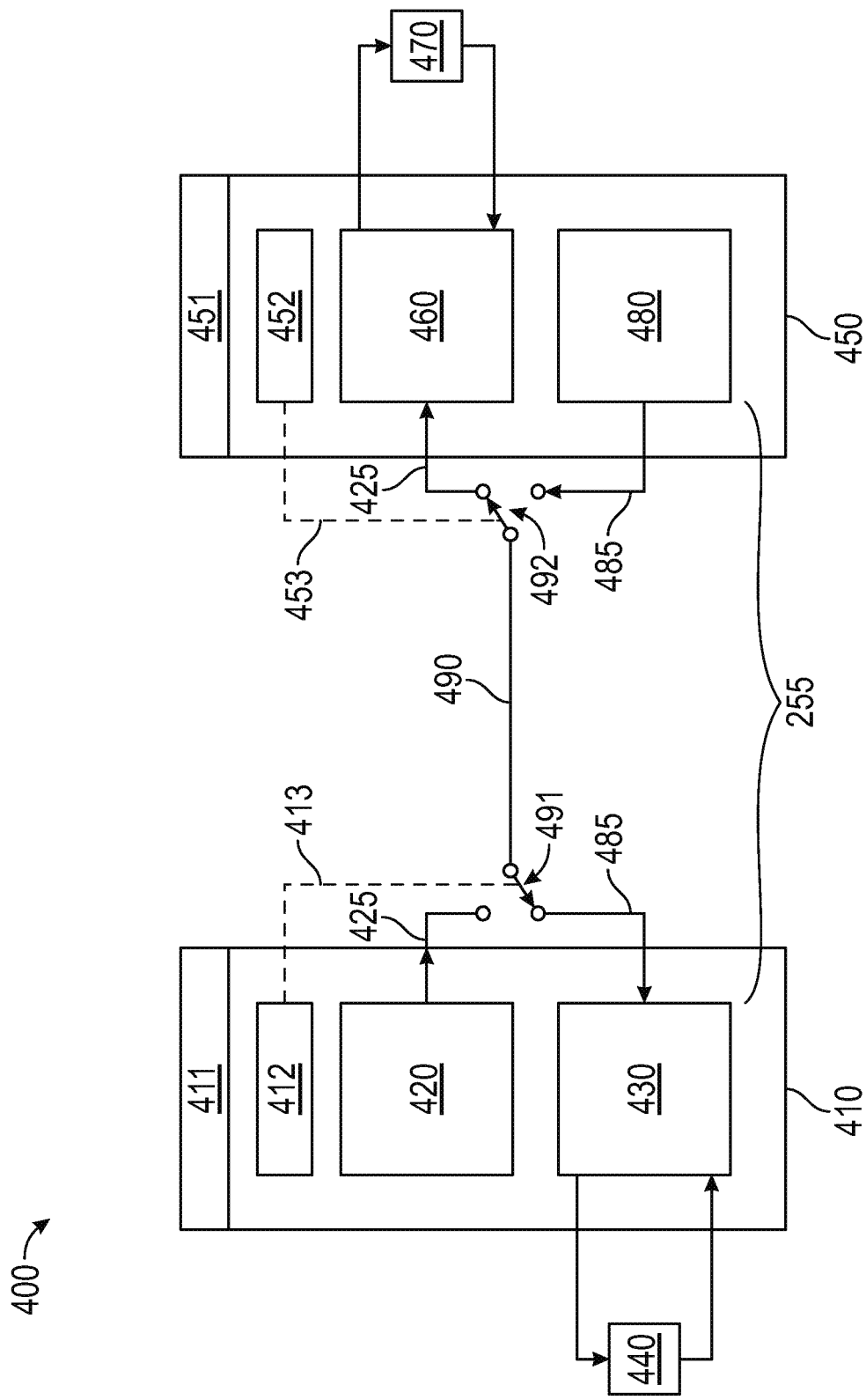
FIG. 4 is a half-duplex arrangement such that the bi-directional access control system continues to provide directional transmissions connected to the DASA databases as described in FIGS. 1 and 2. For FIG. 4, the data is transmitted here between two controller devices either one of which may function as a user and/or access device with computers. At least one controller device includes a transmitter, a receiver, and a rules processor that may or may not utilize a computer.

In FIG. 4, for a half-duplex arrangement, the bi-directional access control system (400) provides bi-directional transmissions connected to the DASA databases as described in FIGS. 1 and 2 above. This system (400) operates in a similar manner to that described in FIG. 3, system (300). As shown in FIG. 2, data is transmitted (255), here between two controller devices (410,450), either one of which may function as a user and/or access device with computers (411, 451). In order to properly function, controller device (410) includes a transmitter (420), a receiver (430) and rules processor (440), that may or may not utilize computer (411). Controller device (410) also includes a data path controller (412) with a data path switch (491). The control line (413) is the connection that controls the position of data path switch (491). Here, the controller device (450) includes a transmitter (480), a receiver (460) and rules processor (470) that may or may not utilize computer (451). Controller device (450) also includes a data path controller (452) and data path switch (492). The control line (453) is the connection that controls the position of data path switch (492).

The data path controllers (412, 452) are used to change the path direction from the default receive direction to the transmit direction utilizing the data path switches (491 and 492). This allows for the data path (490) to operate in a bi-directional manner, with the caveat that the data (255) traffic continues along a unidirectional flow path at any given instance. In this manner a controller device (410, 450) can either transmit or receive in one direction at a time but never simultaneously transmit and receive. The data path switches (412 and 452) in their normal default positions connect each of their respective receivers (430 and 460) in the default receive data positions. This embodiment allows the controller devices (410, 450) to receive transmissions on a continuous basis.

When the controller device (410) is called upon to transmit data (255), the data path controller (412) ensures that no data is currently being received by the receiver (460) and the data path switch (491) is switched to the data transmit position which connects data path (425) to bi-directional data path (490). In addition, data path controller (452) keeps its data path switch in the default data path receive position, connecting bi-directional data path (490) to data path (425) which is connected to receiver (460).

Controller (410) assembles data beginning in the transmitter (420) and transmits the data (255) as signals in the now longer transmission path. These signals that are now traveling along a longer transmission path that is followed and starts at 425 (the initial data path) continues thru 491(*a* first data path switch), 490 (the bi-directional data path), and 492 (a second data path switch) and then back to 425 again, which is the initial data path ending at receiver (460) and processed by rules processor (470) as previously described in FIG. 2 and more detailed within this specification.

When the controller device (450) is called upon to transmit data (255) the data path controller (452) ensures that no data is being currently received by the receiver (480) and that data path switch (492) is switched to the data transmit position which connects data path (485) to bi-directional data path (490). In addition, data path controller (412) keeps its data path switch in the default data path receive position, connecting bi-directional data path (490) to data path (485) which is connected to receiver (430).

Controller (450) assembles data as described in FIG. 2 and transmits the data (255) via transmitter (480) as signals are now traveling along a longer transmission path such that the path followed starts at 485 (the initial data path) continues thru (492), a first data path switch, (490) the bi-directional data path, and (491), a second data path switch, and then back to (485) again, which is the initial data path ending at receiver (430) and processed by rules processor (440).

The data flow direction will be specific to the requirements of the system (400) and normally different data will be transmitted (255) and processed under a different set of rules processed by the rules processors (440, 470). This system provides a half-duplex arrangement allowing for data in each direction over a single data path which may exist in the same virtual/physical/real space or different virtual/real/physical spaces.

Encryption

For a system with at least one encryption application existing for master and/or partial DASA databases, the encryption application possesses one or more keys. Data transmission from the user device(s) are encrypted with keys. The data transmission is received by the access devices and decrypted with the keys. The identical keys are utilized if the encryption is symmetric and different keys are utilized if the encryption is as asymmetric.

One or more keys are generated with one or more computerized computations from a subset of data with user specific information existing within a designated portion of the user's record of the DASA databases (master or partial) such that authentication is implemented according to the first set of authentication rules described above. The encryption levels are more specifically described in FIGS. 5, 5A, 5B, 5C, and FIG. 6 and include as the first set of rules both encryption and decryption.

The encryption application(s) are secured in one or more secured databases, within a secured cloud, or other secured computer aided storage system(s) that utilize one or more of the group selected from a data memory storage device, a database, a computer accessible cloud, a network, internet, intranet, and/or at least one server.

One or more encryption applications are employed together with the securitization system described in FIGS. 1-4 above, utilizing one or more DASA databases. The at least single level of encryption process is as follows;

a first level of encryption and decryption of data transmission utilizing keys wherein a first set of encryption keys exist and are retrieved from one or more encryption applications, the applications existing within one or more memory storage devices or databases that individually, collectively and/or collaboratively contain the encryption keys, wherein a user accesses and utilizes at least a single key that exists in both one or more user devices and one or more access devices via utilization of (DASA) databases that exists for and are accessible by both virtual and real user devices and the associated access devices, wherein at least a single key exists within all devices, thereby alleviating a need to distinguish between user ID's;

a second level of encryption and decryption of data transmission utilizing keys wherein at least one user ID is attached to the data and wherein the user ID must be placed within an unencrypted portion of the data such that the user can access and acquire at least one key from the user record but not out of the encryption application, such that every user possesses their own key and an unencrypted user ID in received data that is utilized to select one or more user's data records such that at least one key from one or more user's data records is utilized; and wherein the user ID attached to the data is attached via a tag of the data and;

wherein a third level of encryption and decryption of data transmission utilizing keys provides for multiple user records that exist for multiple users wherein the user can access and acquire keys wherein the keys residing within the DASA database(s) are constantly changing thereby requiring smart user devices that can utilize constantly changing keys;

a fourth level of encryption and decryption of data transmission utilizing keys wherein the keys are located in an expanded data record field within a range of data records so that the designated portion of the expanded data record field is utilized wherein the keys are in a first record of the designated portion, thereby providing one or more unique keys for each and every data transmission.

In at least this instance, this 4th level of encryption includes a designated portion which is also constantly changing.

A fifth level of encryption and decryption of data transmission utilizes keys such that computerized computations produce keys from any combination of a group consisting of; record numbers, recorded time, and random numbers associated with one or more user records and wherein one or more algorithm produced keys exist and allow for generation of an identical key using an identical algorithm for decryption. In this instance, a specific group of numbers are being accessed and taken from the user record and transmitted to the access device.

For this fifth level of encryption these one or more algorithm produced keys exist within at least one of the DASA databases. Here, in each and every instance of transmitting data, a new set of keys (one or more pairs) can be generated without transmitting a new set of keys from the user device(s) to the access device(s). In the absence of transmission of the new set of keys, it is impossible for interception of the new set of keys without access to any of the DASA databases (which themselves may be encrypted).

In fact, for all levels of encryption, if data fields are picked that are changed during use of the user device(s), it is impossible to intercept the keys without access to the DASA databases. The DASA databases themselves are encrypted to protect against unauthorized access. The DASA databases are protected by utilizing a system key for each user to be allowed access to the overall system. Each attempt for access may cause a new TS code be provided from the user device (240 in FIG. 2) and provides for each attempt, thereby each attempt results in an ability to encrypt a different encryption for and of the data, the data transmission, and the new code.

Figure 5:
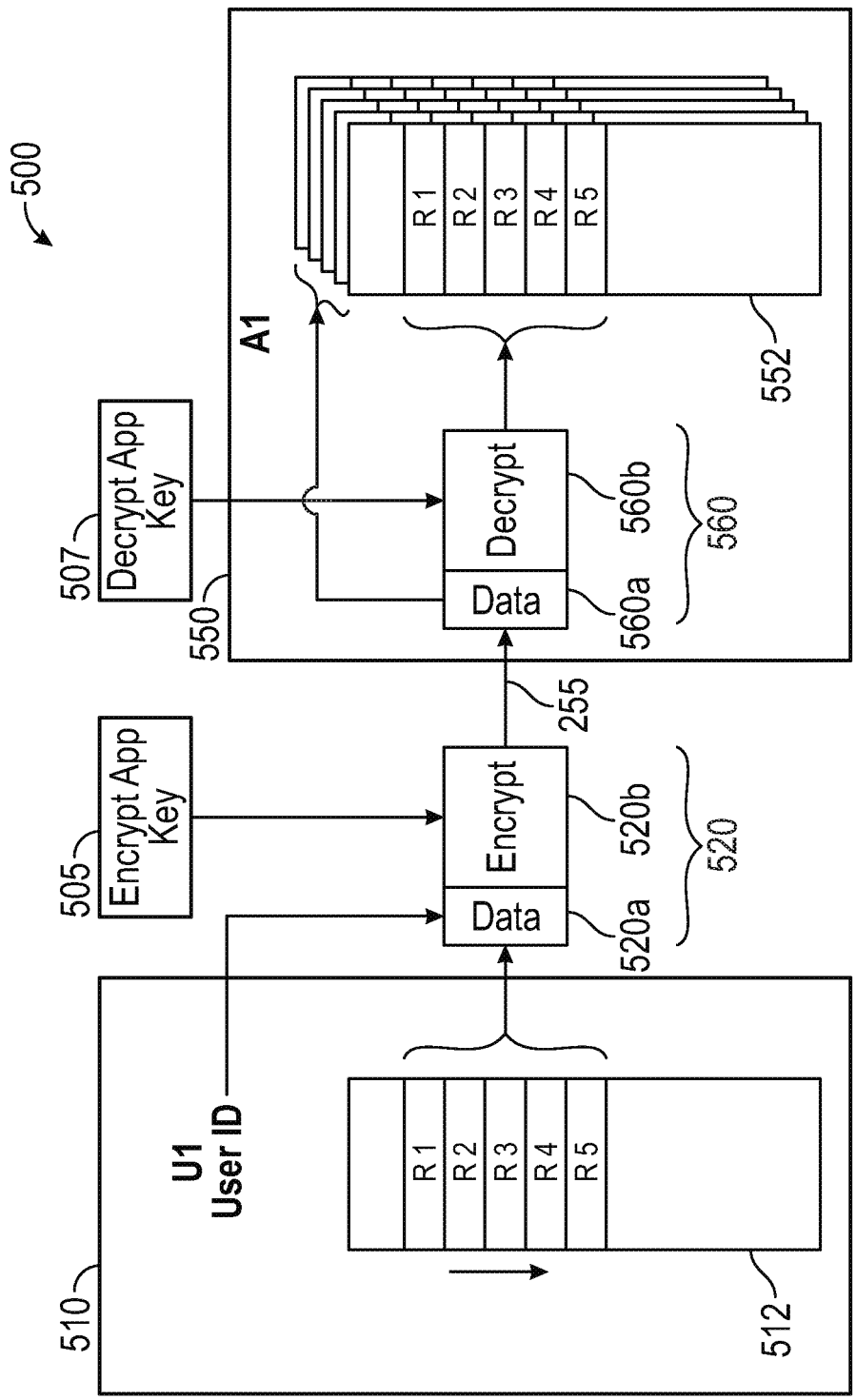
FIG. 5 depicts a system detailing the first level of encryption and decryption of data transmission with and for one or more user device(s) and access device(s) utilizing one or more keys such that a first set of encryption keys exist and are used by one or more encryption/decryption applications. In this instance, the encryption application key resides in the memory of user device(s). Likewise, the decryption application key resides in the existing access device.

FIG. 5 depicts a system detailing the first level of encryption and decryption of data transmission (500) with and for one or more user device(s) (510) and access device(s) (550) utilizing one or more keys (505, 507) such that a first set of encryption keys exist and are used by one or more encryption (520)/decryption (560) applications. In this instance, the encryption application key (505) resides in the memory of user device(s) (510). Likewise, the decryption application key (507) resides in the existing access device (550). The user device (510) accesses and utilizes at least a single key (505) that exists in one or more user devices (510) and one or more access devices (550) via utilization of (DASA) databases that exists for and are accessible by both virtual and real user devices (510) and the associated access devices (550), wherein at least a single key (505, 507) exists within all devices, thereby alleviating a need to distinguish between user ID's. The encryption keys (505, 507) are identical if symmetric encryption is utilized and different when asymmetric encryption is utilized.

As further detailed in FIG. 5, the transmitter (520) contains transmitter data memory (520a) with a transmitter encryption application (520b). The receiver (560) contains receiver data memory (560a) and receiver decryption application (560b). This basic system includes user device(s) (510) that contain single file records (512) with data that is transmitted (255) via signals to the transmitter (520) and the receiver (560) of access device(s) (550) that can contain multiple files within multiple records (552). The signals carrying the data from the data memory (520a) once passed through the transmitter encryption application (520b) are transmitted via data transmission (255) to the receiver (560). The receiver (560) receives the data in the receiver data memory (560a) and decrypts the data in the receiver decryption application (560b).

Figure 5A:
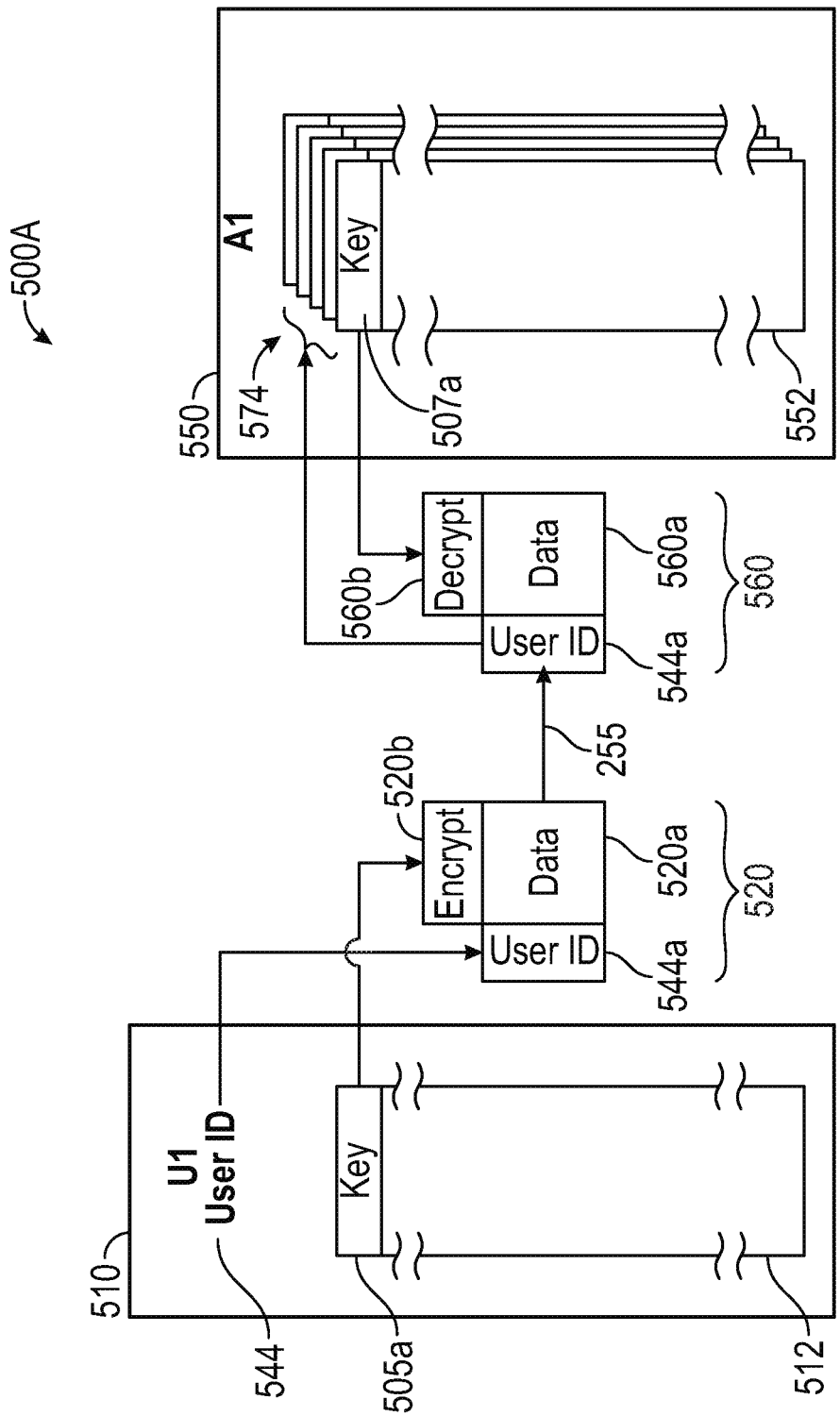
FIG. 5A is a schematic diagram indicating the functionality of the second and third levels of encryption and decryption of data transmission.

FIG. 5A is a schematic diagram indicating the functionality of the second and third levels of encryption and decryption of data transmission (500A). For the second level, the following process begins with utilizing encryption key 505a which is placed in the user device (510) memory as one or more static elements within single file records (512). Encryption key 507 is placed in the access device (550) memory as multiple static elements within one of multiple file records (552) selected by record selector user ID (574). Selected multiple record files (552) corresponds with user device U1 (510), record (512), such that encryption keys 505a and 507a are an encryption key pair. At this level, at least one user ID, U1 (544) is attached to the data transmission memory (520a). Here, the user ID (544) must be placed within an unencrypted portion of the transmitter data memory (520a). To initiate the transmission process, data (520a) is placed in the transmitter memory (520). Next, key (505a) is used by encryption application (520b) to encrypt data (520a). User ID (544) is added as a tag (544a) to unencrypted transmitter memory. Transmission of encrypted data (520a) and unencrypted user ID tag (544a) is sent to via data transmission of signals (255) to receiver (560). User ID tag (544a) then acts as a record selector user ID (574). This provides access to the decryption key, (507a). This key (507a) is used by the decryption application (560b) to decrypt data (560a) in the receiver (560). In this manner, it is now possible to provide a unique key pair for each user device.

The third level of encryption is identical to that of the second level with the exception that utilizing encryption key 505a which is placed in the user device (510) memory is one or more dynamic elements within single file records (512). Encryption key (507a) is placed in the access device (550) memory as multiple dynamic elements within one of multiple file records (552) selected by record selector user ID (574). Selected multiple record files (552) still correspond with user device U1 (510), record (512), such that encryption keys (505a) and (507a) remain an encryption key pair. For this third level of encryption and decryption of data transmission the keys (505a and 507a) which are now dynamic keys residing within one or more DASA databases and are constantly changing. This now requires smart user devices that can distinguish between keys.

Figure 5B:
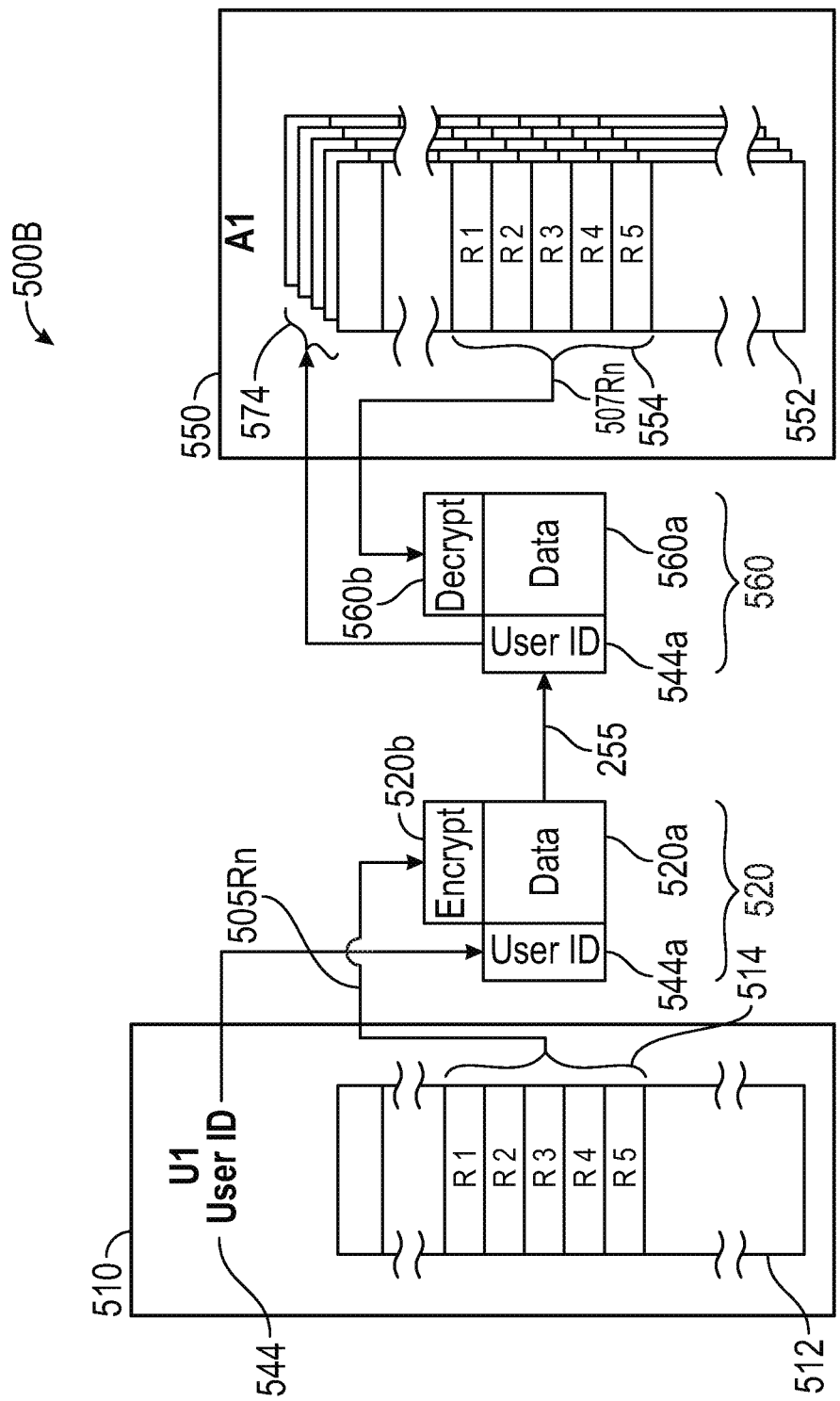
FIG. 5B is a schematic diagram indicating the functionality of the fourth level of encryption and decryption of data transmission utilizing keys.

FIG. 5B is a schematic diagram indicating the functionality of the fourth level of encryption and decryption of data transmission utilizing keys (500B). At this level, encryption key (505a) no longer exists but instead encryption keys (505Rn) are selected from one or more records residing in the user device (510) within single file record (512) with designated portion (514) as these encryption keys (505Rn) can be constantly changing. Likewise, decryption key (507a) no longer exists, but instead decryption keys (507Rn) are selected from access device (550) memory within one of multiple file records (552) selected by record selector user ID (574) with designated portion (554) which corresponds, in that, it possesses identical keys to those of single file record (512). This technique provides for encryption and decryption of the authentication process. More specifically, for every transaction that occurs, a new encryption key is used by selecting keys from different records of an expanded record field from either the user device or access device or both. In addition, TS codes can be utilized in combination with the encryption keys to further authenticate each transaction. This provides for continuously changing authentication and encryption. In some cases, this 4th level of encryption includes a designated portion (514, 554) which is also constantly changing. The DASA databases themselves are encrypted to protect against unauthorized access. The DASA databases are protected by utilizing a system key for each user to be allowed access to the overall system. Each attempt for access may cause a new TS code be provided from the user device (240 in FIG. 2) thereby each attempt results in an ability to encrypt a different encryption for and of the data, the data transmission, and the new code.

Figure 5C:
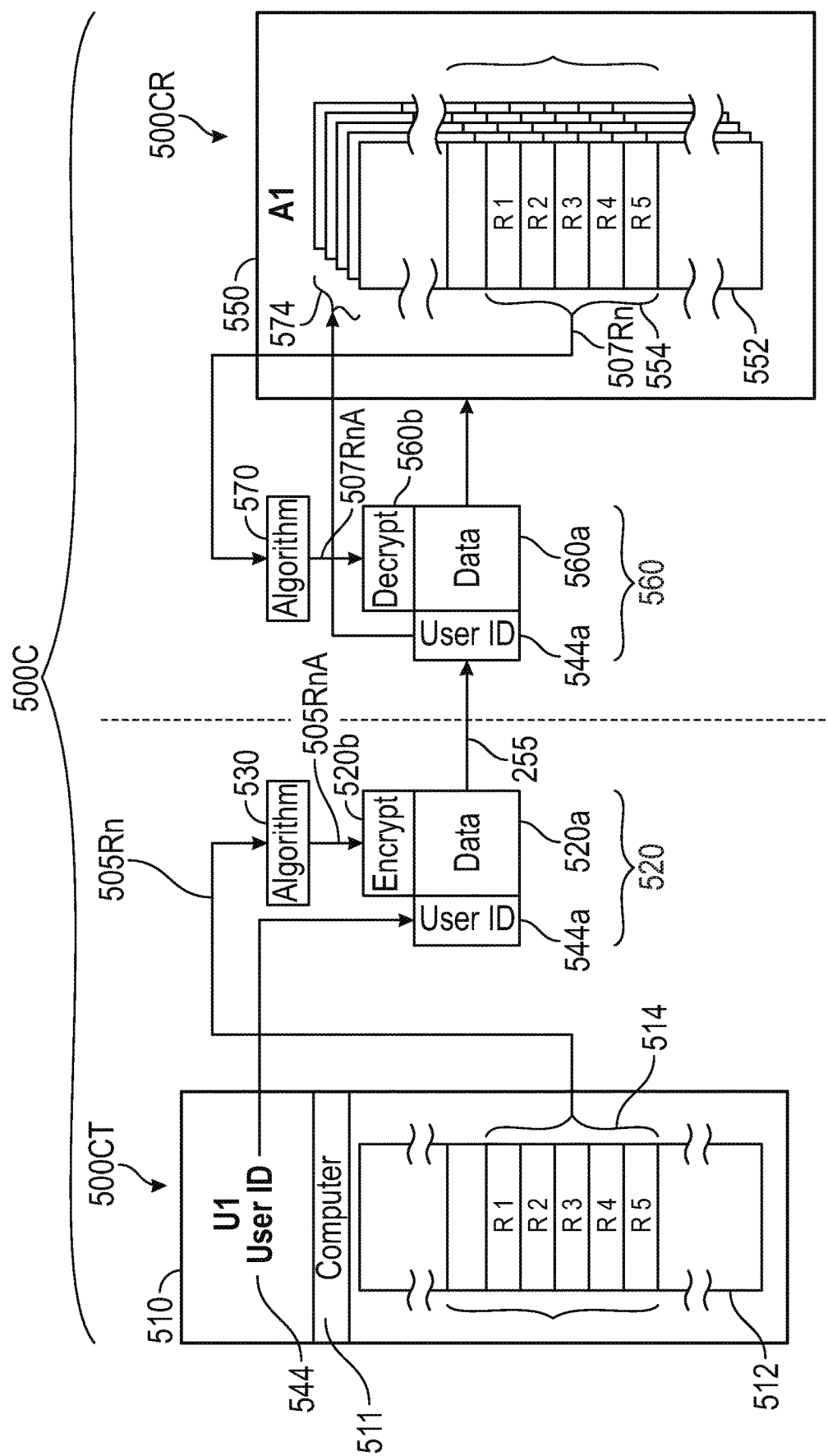
FIG. 5C is a schematic diagram indicating the functionality of the fifth level of encryption (500 C) which has additional features added to the fourth level of encryption.

FIG. 5C is a schematic diagram indicating the functionality of the fifth level of encryption (500 C) which has additional features added to the fourth level of encryption. In this case 500 CT refers to the transmission portion of this $5^{th}$ level and 500CR corresponds with the receiving portion of level 5. One feature is the use of an algorithm (530, 570) for both the user device(s) (510) and access device(s) (550) that adds another level of sophistication to keys by generating a series of algorithmically created keys (505RnA, 507RnA). Algorithm generator (530) receives key (505Rn) and computes via an algorithm a new key (505RnA) is generated which is used by encryption application (520b). Similarly, algorithm generator (570) receives key (507Rn) and computes via an algorithm a new key (507RnA) that is generated and which is used by decryption application (560b). Each newly created key is applied to a sub-portion of the data, thereby increasing protection for the overall system. Algorithm generators (530,570) can produce keys from any combination of a group consisting of; record numbers, recorded time, and random numbers associated with a user record (512) and/or access record (552). These newly created keys from the record are applied to the data by adding more key bits. In this instance the algorithm is expanding the effective size of the keys.

Here, in each and every instance of transmitting data (255), a new set of keys (one or more pairs) (505RnA, 507 RnA) can be generated without requiring transmission of these new set of keys from the user device(s) (510) to the access device(s) (550). In the absence of transmission of the new set of keys (505RnA, 507 RnA) it is impossible for interception of the new set of keys.

An additional feature for this fifth encryption level involves the addition of a computer (511) to control the user device(s) (510) to provide algorithm computation capabilities. The fifth level of encryption includes the possibility of supplying one or more algorithm produced keys from one or more DASA databases. In the absence of transmission of the new set of keys it is impossible for interception of the new set of keys without access to the DASA database. In addition, for all levels of encryption (levels 1-5 as described in FIGS. 5A-C), if data fields are picked that are changed during use of said user device, it is impossible to intercept said keys without access to said DASA database.

Figure 6:
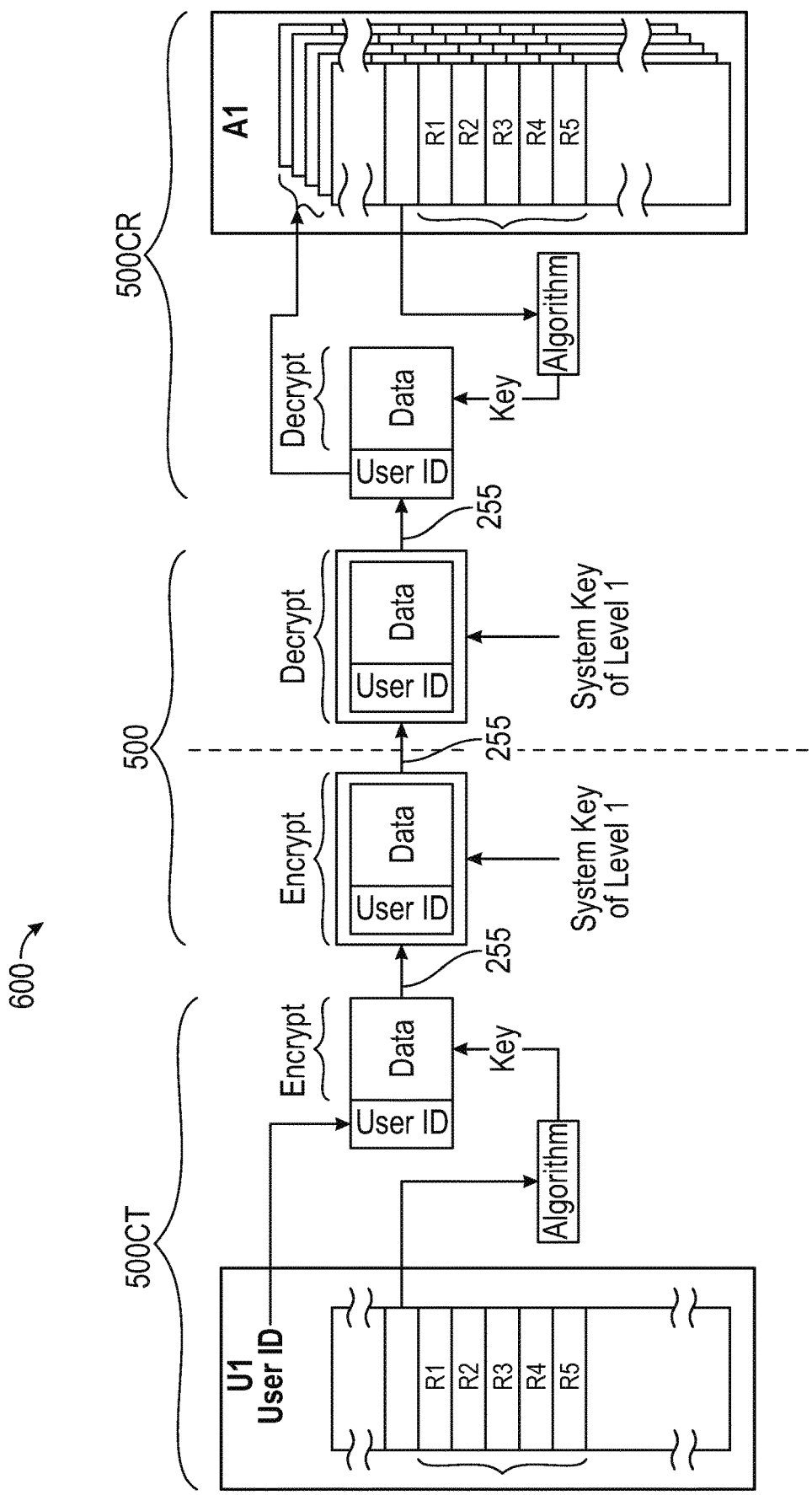
FIG. 6 depicts a system with an overlapping or layered set of encryption levels.

FIG. 6 depicts a system with an overlapping or layered set of encryption levels (600). In this example, the $5^{th}$ level of encryption is first invoked (500CT), followed by taking the transmitted encrypted data (255) produced by the 5th level of encryption (500CT) that is followed by further encryption utilizing the $1^{st}$ level of encryption (500). The transmitted data (255) is then further transmitted to the receiving device that utilizes the first level decryption of the first level encryption (500) to decrypt the data. This data is again transmitted (255) to the receiving portion (500CR) which subsequently decrypts the fifth level of encryption. The purpose for this technique is that levels 2-5 as provided herein, do not encrypt the user ID tag, however the first level described encrypts all the data, thereby securing the user ID tag for levels 2-5 (all levels of encryption).

Mesh Networks

Figure 7:
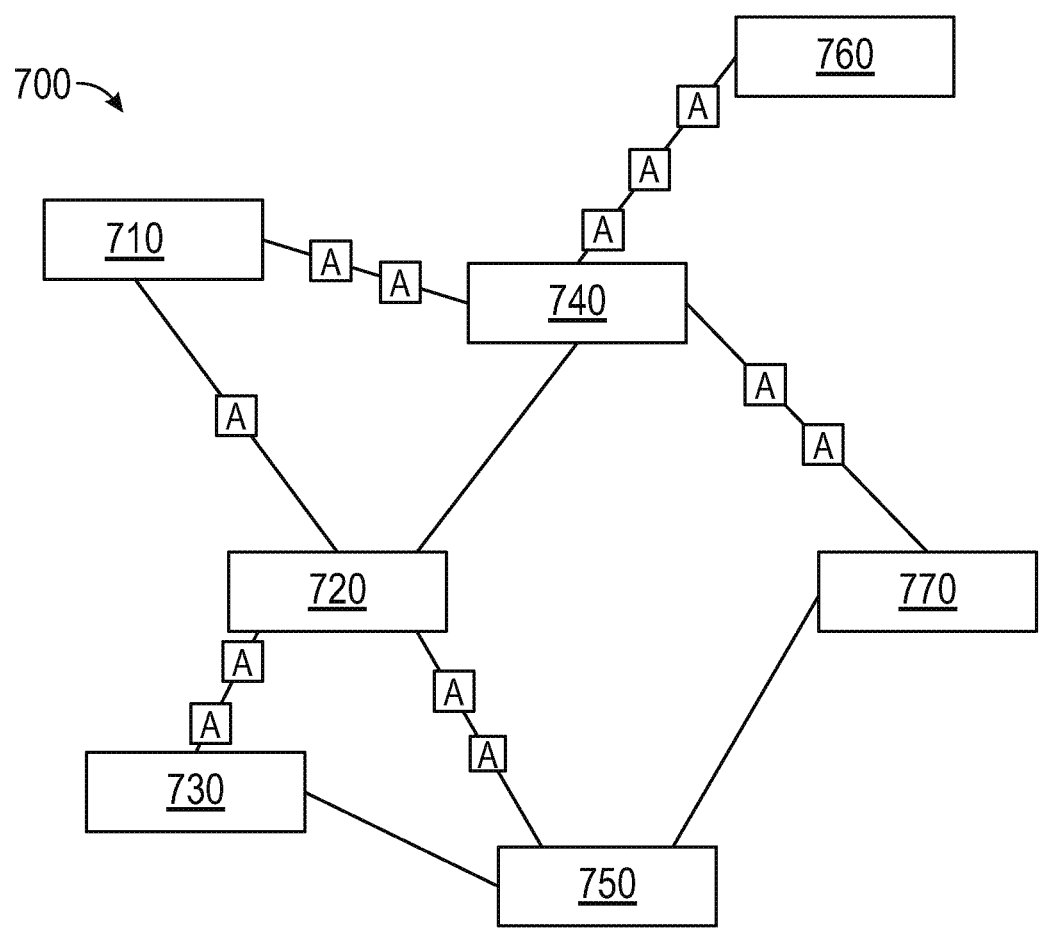
FIG. 7 is a schematic representation of a mesh network that coordinates multiple securitization systems (as described in FIGS. 1-4) that are networked so that they may communicate with one another.

FIG. 7 is a schematic representation of a mesh network that coordinates multiple securitization systems (700), as described in FIGS. 1-4, that are networked so that they may communicate with one another. The DASA databases as well as user and access devices may be connected together as a mesh network utilizing one to one and/or one to many and/or many to many data connections. For FIG. 7, items 710, 720, 730, 740, 750, 760, and 770 represent DASA databases, user devices and/or access devices as previously described. In order to route data through one or more of these devices, additional routing software and computational capability is required. For example, the connection from 740 to 760 indicates a one-to-one data communication connection. In another case, a "one to many" communication connection exists from 710 to 720 as well as from 710 to 740. A further example of a "many to many" connection is depicted as communication data connections from 720 to the list of 710, 730, 740 and 750. Data communication amplifiers, repeaters, and/or range extenders which optionally assist in ensuring signal integrity and strength, over various communication distances are depicted as small boxes with a designated "A" which are located in the data communication flow paths connecting the DASA databases, user devices, and/or access devices. These amplifiers are provided to complete the mesh network as required. These connections may or may not be encrypted with either our five level encryption technology or with those of others. These connections may also be full or half-duplex systems as described in FIGS. 3 and 4 respectively.

The mesh network can route signals redundantly in the case of poor or broken connections. By doing so, the network provides the additional benefit of increasing reliability and speed of data transmission as well as ensuring our securitization and encryption system is viable. Data connection can be provided for peer-to-peer across the mesh network without the use of a central server. Without the use of a central server, encrypted data can be moved across redundant paths in the network utilizing peer-to-peer encryption from endpoint to endpoint without the need to decrypt and re-encrypt the data at any intermediate location along the data-path.

Specifically, in one situation, a user device (710) may communicate with an access device (770). This communication would normally travel the shortest route, connecting (710) through (740) to (770). If there are any data communications issues or interruptions or delays in a communication link for instance the link between (740) and (770) is not functioning, then the network would reroute the communications through an alternate (albeit longer) path. For example, the alternate path could be (710) to (740) to (720) to (730) to (750) to (770).

Figure 7A:
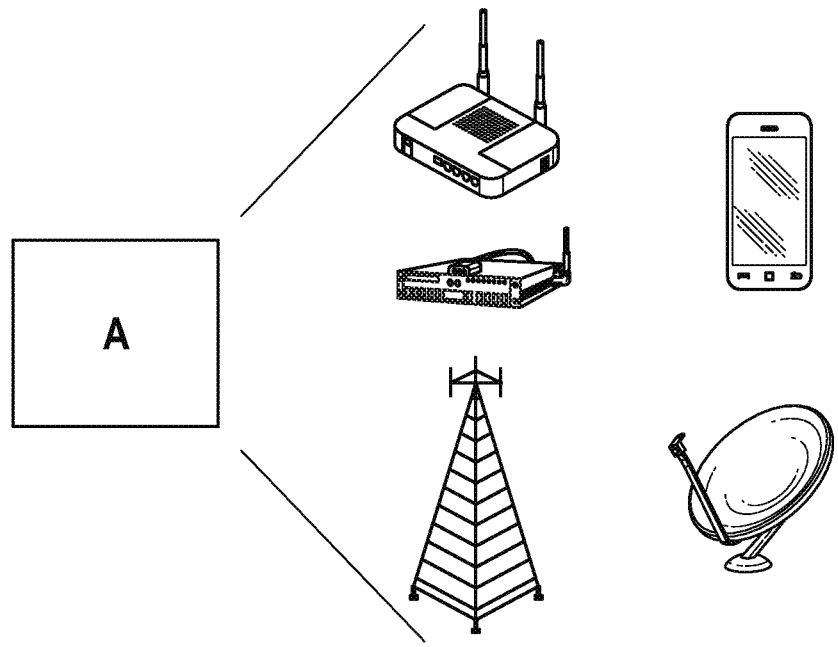
FIG. 7A is a schematic representation that further illustrates and demonstrates actual and various devices using exploded views to indicate the myriad of possible devices that are possible for use in the mesh network as well as throughout the FIGS. 1-6 of the present disclosure.
Figure 7A:
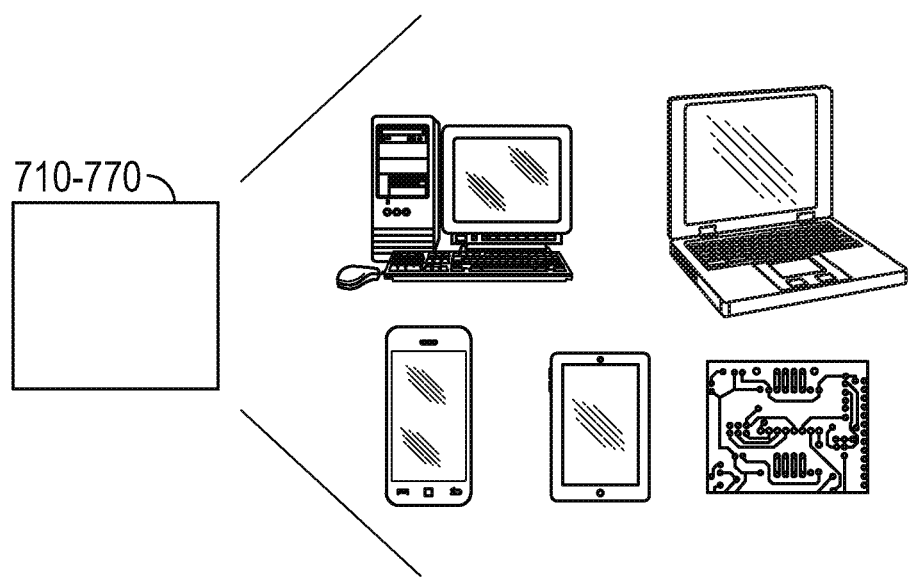

FIG. 7A further illustrates and demonstrates actual and various devices using exploded view callouts from that depicted in the schematic diagram shown in FIG. 7 and described above (in e.g. FIG. 1) For FIG. 7, items 710, 720, 730, 740, 750, 760, and 770 (710-770) represent DASA databases, user devices and/or access devices as desktop or stand-alone computer terminals replete with hard drives, laptop computers, cellular or smart telephones, computer tablets such as the iPad® and even printed circuit boards or integrated circuits (ICs). Further, elaborating on the virtual user device, U4 (190) as described above, can be created and are shown as real output device(s) (191) e.g. printers, scanners, tokens, stamps, RFID tags, (193,194) existing on or in cell phones or scanners (195) and/or functioning encoders, wave scanners, and/or electromagnetic devices (196-199). It remains important to understand that these real devices can be used to create virtual user devices (U4).

As stated above, the further example of a "many to many" connection was depicted as communication data connections from 720 to the list of 710, 730, 740 and 750. Data communication amplifiers, repeaters, and/or range extenders which optionally assist in ensuring signal integrity and strength, over various communication distances are depicted as small boxes with a designated "A" which are located in the data communication flow paths connecting the DASA databases, user devices, and/or access devices. These amplifiers, repeaters, and/or range extenders are further depicted here in FIG. 7A using exploded view callouts for block A to illustrate the real devices that correspond to data communications devices including; wireless transmitters and receivers, conventional and dish type antennae, and even cellular or smart telephones. These devices are all used to complete the mesh network as required.

Figure 8:
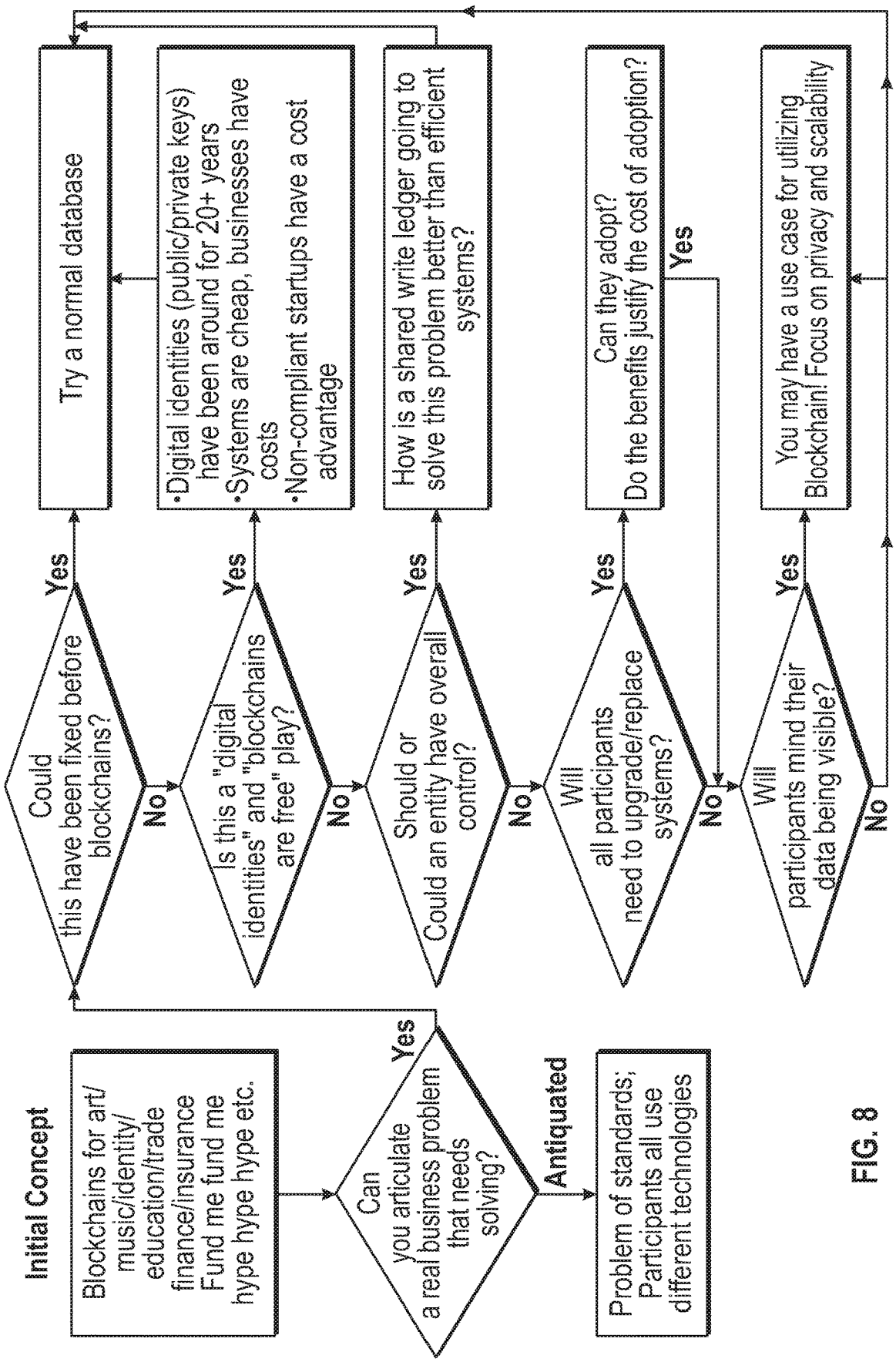
FIG. 8 is a flow diagram that provides a methodology to determine the usefulness of a Blockchain.

FIG. 8 is a simple flow chart that provides a logic methodology that assists in determining both the usefulness and type of blockchain that may be required by a user. Implementation of the blockchain into the system described in FIGS. 1-7A above will provide security for the DASA system. In addition, insertion of the DASA system into one or more blockchains or types of blockchains will improve the security of any of the blockchains.

Tolerance

Further, the designated portion of a user's record can also include tolerance when data is in transit from the designated portion to the access device and wherein transit of the data is synchronized between the user device and the access device. According to the first set of rules defining authentication, this first set of rules also relates, corresponds with and can invoke tolerance rules that search for an access device's data record regarding data sent by the user device(s).

When the data in transit is not synchronous and when the data is transmitted outside of a predetermined and limited tolerance, no authentication can be achieved. When synchronization is not occurring, resynchronization is achieved by changing the designated portion during access to the access device(s) to match the designated portion of the user device(s), thereby achieving resynchronization.

When resynchronization occurs, the user ID is utilized to select the user record according to the third set of rules, thereby allowing the user record to be encrypted and produce one or more keys via one or more computerized computations from a known portion of the DASA databases. The resynchronization routine recognizes a specified set of users to ensure proper resynchronization in order that the access device can properly allow or deny access for that specified set of users. During a routine (process) of trying to authenticate, a user must decrypt each data record within the designated portion that possess its own unique key. This routine or process continues until the user finds a match of said data record with said key. Routine in this instance refers to the need for resynchronization and the actual process of resynchronization.

The tolerance for this access control system, provides a desired range within which the system will operate and the tolerance utilizes one or more record numbers generated and obtained via one or more computerized computations that encrypt and decrypt random numbers.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

The computer readable media described within this application is non-transitory. Here, the transmission of data is transmitted via signals that are non-transitory signals.

In addition, each and every aspect of all US Provisional and Non-Provisional Applications as well as already granted patents cited above are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more access devices or one or more user devices or both one or more access devices and one or more user devices comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; one or more real or one or more virtual master distributed auto-synchronous array (DASA) databases or both one or more real and one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner, or both an independent manner and a collaborative manner, and wherein said master and said partial DASA databases configure bi-directional transmission of data that exists within, along, or external to one or more securitized blockchains, this bi-directional data transmission to and from one or more partial user devices, to and from one or more partial access devices, or to and from both one or more partial user and one or more partial access devices, wherein said user devices and said access devices are computing devices, and wherein said one or more partial user and said one or more partial access devices store and provide at least partial copies of portions of said master DASA databases, and wherein said master DASA databases, said partial DASA databases, or both said partial DASA databases and said master DASA databases are linked and communicate with each other and utilize one or more securitized blockchains with one or more logging and monitoring databases that provide statistical and numerical calculations utilizing said data, wherein said one or more devices authenticate using a first set of computing operations, and validate using a second set of computing operations, and wherein a third set of computing operations controls access for a specified set of users.

2. The one or more access devices and user devices of claim 1, wherein said master and said partial DASA databases analyze and provide information in a form of data and act to control one or more output devices, wherein said one or more output devices are computing devices, wherein said one or more output devices create user devices and wherein said securitized blockchains are securitized by implementation of said access devices.

3. The one or more access devices and user devices of claim 1, wherein said partial user devices and said partial access devices are independent and provide computing operations that utilize one or more securitized blockchains without a need for other partial user devices and other partial access devices and wherein said partial user devices and said partial access devices are networked and cooperate to complete required operations within, along, or external to one or more blockchains that are not securitized.

4. The one or more access devices and user devices of claim 1, wherein said user devices include at least one virtual user device that provides a separate storage and retrieval location which is utilized in a sequential manner where said virtual user device is not physical but operationally appears as if it is a physical device that exists within, along, or external to one or more blockchains, wherein said at least one virtual user device comprises executable software.

5. The one or more access devices and user devices of claim 4, wherein said at least one virtual user device provides data that is within, along, or external to one or more blockchains for said partial access devices where virtual user device functionalities are provided via said partial access devices.

6. The one or more access devices and user devices of claim 5, wherein said logging and monitoring database exists within, along, or external to one or more blockchains and includes temporal aspects regarding said data.

7. The one or more access devices and user devices of claim 1, wherein said partial access devices act upon said partial user devices and provide for distinguishing a physical user device from a virtual user device and wherein said partial access devices utilize said partial user devices without distinguishing said physical user device from said virtual user device and wherein said virtual user device requires utilization in sequence unless tolerance allows for computer operations that provide rules for out of sequence usage.

8. The one or more access devices and user devices of claim 1, wherein said partial DASA databases operate independently and utilize a designated portion of a user's record existing within said partial DASA databases that exist within, along, or external to one or more blockchains and ultimately said partial DASA databases operate within said master DASA database and wherein said partial DASA databases store and retrieve data but are not required to perform data manipulation with computational operations.

9. The one or more access devices and user devices of claim 1, wherein said partial user devices transmit data that exists within, along, or external to one or more blockchains but are not required to perform computational operations, and wherein said partial user devices are selected from a group consisting of; tickets, chits, tokens, RFID tags, radio, electrical, magnetic, electromagnetic and radiative tags, and wavelengths of optical and wavelengths of sonic energy tags.

10. The one or more access devices and user devices of claim 1, wherein said transmission of data is transmitted via signals that exist within, along, or external to one or more blockchains, wherein said signals are generated via at least one form of energy selected from one or more of the group consisting of; electrical, optical, mechanical, chemical, magnetic, radiative, electro-optical, electro-mechanical, electrochemical and electro-magnetic energy.

11. The one or more access devices and user devices of claim 1, wherein according to said first set of computing operations, authentication attempts utilize a designated portion of a user's record where said first set of computing operations invoke constantly changing said designated portion within said user's record of said auto-synchronous either master or partial DASA database or both master and partial DASA databases, wherein both master and partial DASA databases exist within, along, or external to one or more blockchains.

12. The one or more access devices and user devices of claim 1, wherein non-authentication events do not cause constant changing of a designated portion of a user's record within both master and partial DASA databases.

13. The one or more access devices and user devices of claim 12, wherein either non-authentication or authentication events or both non-authentication and authentication events are recorded.

14. The one or more access devices and user devices of claim 1, wherein after authentication, validation occurs according to said second set of computing operations, wherein a subset of data with user specific information exists within a designated portion of a user's record, where validation requires retrieving, analyzing, utilizing and storing said subset of data that exists within, along, or external to one or more blockchains and that is subsequently changed when validation of specific data within said subset occurs and wherein said validation of specific data provides allowance to attempt access.

15. The one or more access devices and user devices of claim 1, wherein after authentication and validation, said third set of computing operations are invoked, in order that access and denial is a recorded event that is stored and resides within a user's records wherein said user's records exist within, along, or external to one or more blockchains and wherein if access is granted verification is provided indicating access occurred.

16. The one or more access devices and user devices of claim 1, wherein as said third set of computing operations are invoked, access and denial is a recorded event stored in said logging and monitoring database that exists within, along, or external to one or more blockchains and that is separate from both master and partial DASA databases.

17. The one or more access devices and user devices of claim 1, wherein at least one encryption application exists within said master or said partial DASA databases or both said master and said partial DASA databases and wherein said at least one encryption application possesses one or more keys and wherein data transmission from said partial user devices is encrypted with said one or more keys and wherein said data transmission is received by said partial access devices and decrypted with said keys.

18. The one or more access devices and user devices of claim 17, wherein said one or more keys are generated from a subset of data that exists within, along, or external to one or more blockchains with user specific information existing within a designated portion of a user's record of said master or said partial distributed auto-synchronous array databases or both said master and said partial distributed auto-synchronous array databases where authentication is implemented according to said first set of computing operations, wherein said first set of computing operations also includes encryption and decryption operations.

19. The one or more access devices and user devices of claim 18, wherein said one or more keys are generated from a subset of data that exists within, along, or external to one or more blockchains with user specific information residing outside said designated portion of said user's record of said master or said partial distributed auto-synchronous array databases or both said master and said partial distributed auto-synchronous array databases where authentication occurs according to said first set of computing operations, wherein said first set of computing operations includes encryption and decryption computing operations.

20. The one or more access devices and user devices of claim 17, wherein said at least one encryption application is secured in a secured database within a secured cloud or other secured computer aided storage system that utilize one or more of the group selected from: a computer accessible cloud, a network, the Internet, an intranet, and at least one server within, along, or external to one or more blockchains.

* * * * *